(12) United States Patent
Maeda et al.

(10) Patent No.: US 8,757,316 B2
(45) Date of Patent: Jun. 24, 2014

(54) TROCHOID DRIVE SYSTEM

(75) Inventors: Taro Maeda, Osaka (JP); Hideyuki Ando, Osaka (JP)

(73) Assignee: Osaka University, Osaka (JP)

( * ) Notice: Subject to any disclaimer, the term of this patent is extended or adjusted under 35 U.S.C. 154(b) by 28 days.

(21) Appl. No.: 13/702,451

(22) PCT Filed: Jun. 7, 2011

(86) PCT No.: PCT/JP2011/063036
§ 371 (c)(1),
(2), (4) Date: Dec. 6, 2012

(87) PCT Pub. No.: WO2011/155485
PCT Pub. Date: Dec. 15, 2011

(65) Prior Publication Data
US 2013/0081499 A1    Apr. 4, 2013

(30) Foreign Application Priority Data
Jun. 11, 2010 (JP) ................................. 2010-134580

(51) Int. Cl.
*B62D 1/28* (2006.01)
(52) U.S. Cl.
USPC .............. 180/408; 180/411; 180/22; 180/7.1; 180/210; 180/211; 180/252
(58) Field of Classification Search
USPC ............. 180/411, 408, 22, 7.1, 210–214, 252
See application file for complete search history.

(56) References Cited

U.S. PATENT DOCUMENTS

| 3,016,966 A | 1/1962 | Hansen |
| 3,232,189 A | 2/1966 | Young |
| 3,336,993 A * | 8/1967 | Carobbe .................... 180/2.1 |

(Continued)

FOREIGN PATENT DOCUMENTS

| JP | 62-289499 | 12/1987 |
| JP | 4-008382 | 1/1992 |

(Continued)

OTHER PUBLICATIONS

Roy P. Gibbens, "Construction and flying a radio controlled lighter than aircraft powered by cycloidal propellers" 4th International Airsip Convention and Exhibition, 2002, Paper A-1.

(Continued)

*Primary Examiner* — Kevin Hurley
*Assistant Examiner* — Michael Stabley
(74) *Attorney, Agent, or Firm* — Jordan and Hamburg LLP

(57) ABSTRACT

A trochoid propulsion system includes wheels provided at three points of the outer edge of an outer wheel part that turns around a driving shaft; and a steering link part that co-rotates with the action part and is movable horizontally on a turning plane. The steering link part includes a liner slider including a guide member attached to a vertical steering shaft that rotates each wheel so that the length direction is in a radial direction of the steering shaft and a moving member that slides on the guide member. In a state where a center of rotation of the steering link part coincides with the driving shaft of the outer wheel part, a rotating shaft provided corresponding to the steering shaft is attached rotatably to the corresponding moving member at a position separated from the steering shaft by a predetermined distance.

8 Claims, 17 Drawing Sheets

(56) References Cited

U.S. PATENT DOCUMENTS

| | | | | |
|---|---|---|---|---|
| 4,463,821 | A | * | 8/1984 | Falamak ................ 180/168 |
| 4,664,213 | A | * | 5/1987 | Lin ........................ 180/212 |
| 4,751,658 | A | * | 6/1988 | Kadonoff et al. ....... 701/301 |
| 5,139,279 | A | * | 8/1992 | Roberts .................. 180/409 |
| 5,727,644 | A | * | 3/1998 | Roberts et al. .......... 180/409 |
| 5,752,710 | A | * | 5/1998 | Roberts .................. 280/91.1 |
| 5,901,805 | A | * | 5/1999 | Murakami et al. ...... 180/168 |
| 5,993,157 | A | | 11/1999 | Perfahl |
| 6,408,230 | B2 | * | 6/2002 | Wada ........................ 701/1 |
| 6,491,127 | B1 | * | 12/2002 | Holmberg et al. ....... 180/252 |
| 7,823,673 | B2 | * | 11/2010 | Asogawa .................. 180/209 |

FOREIGN PATENT DOCUMENTS

| | | |
|---|---|---|
| JP | 2000-0338 | 2/2000 |
| JP | 2003-212190 | 7/2003 |
| JP | 2004-224147 | 12/2004 |

OTHER PUBLICATIONS

Virginia Downward & William M. Clark, "Vertical Paddle Propeller Wheel" 1930.

Endo, Hirose and Togawa "Proposal of glide propulsion", The 16th Nipon Robot Gakkai Gakujutsu Kouenkai Yokonsyu (vol. 1), pp. 209 to 210, 1998 Summary of Invention.

* cited by examiner

Fig. 3A        VELOCITY RELATION : Vw=Vm+Vd
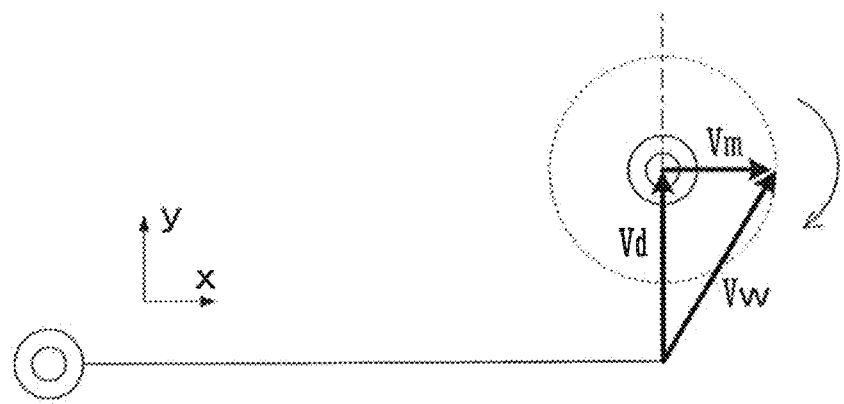
Fig. 3B        LINK CONNECTION : dw=dm+do
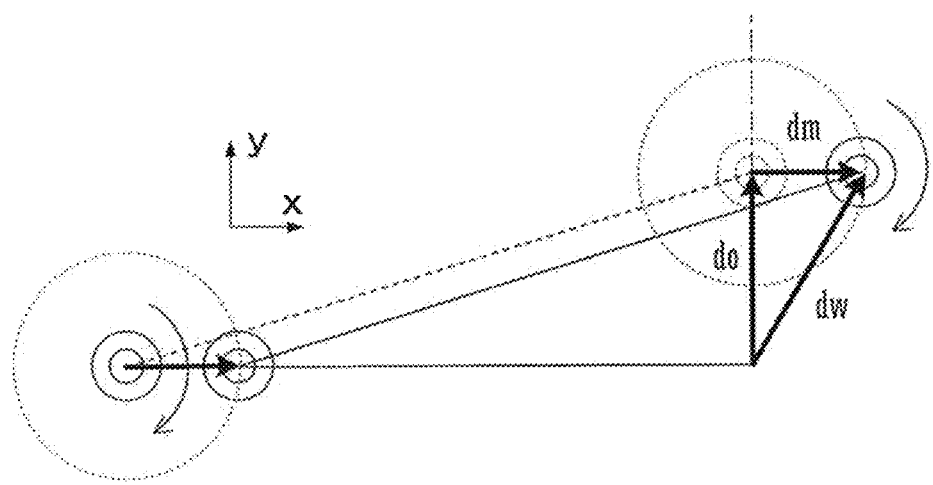

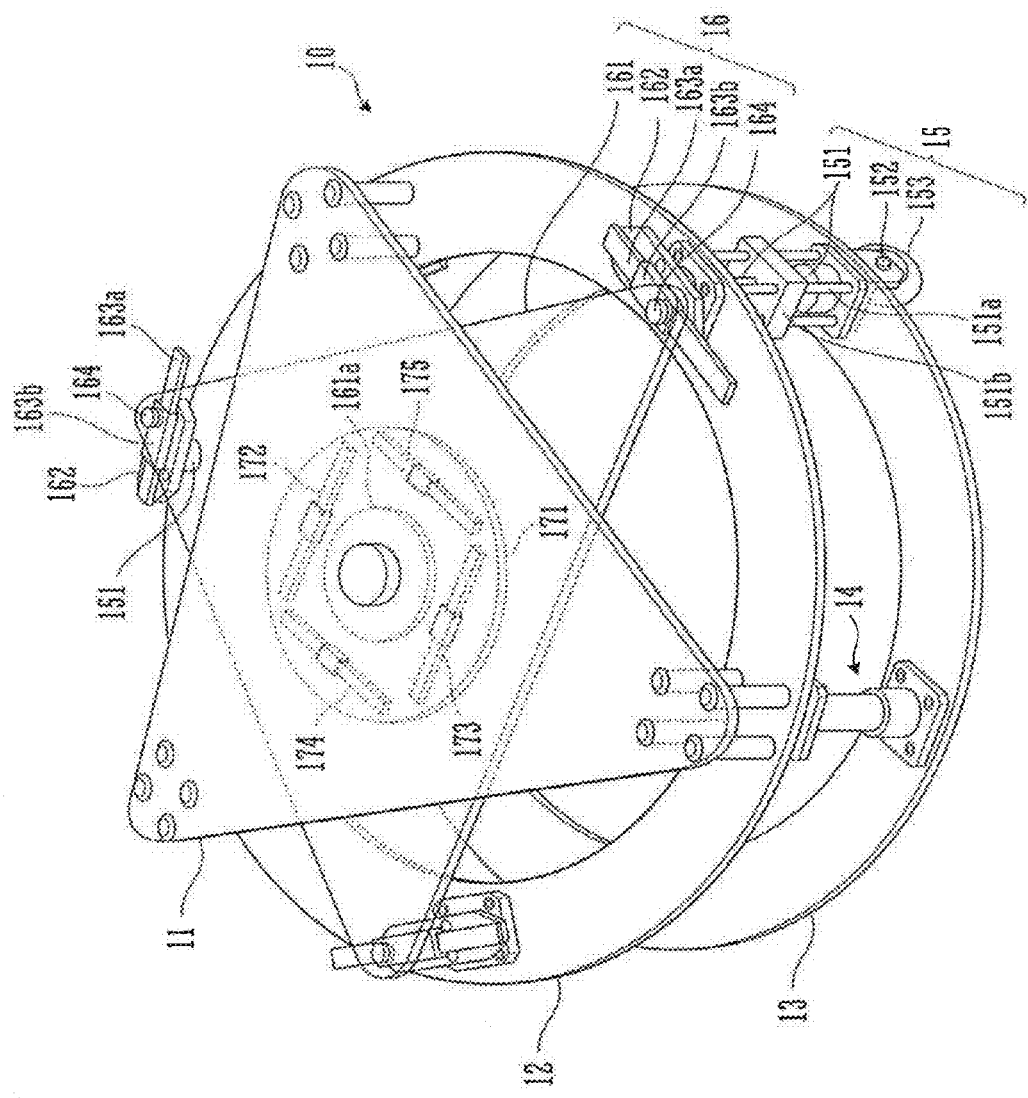

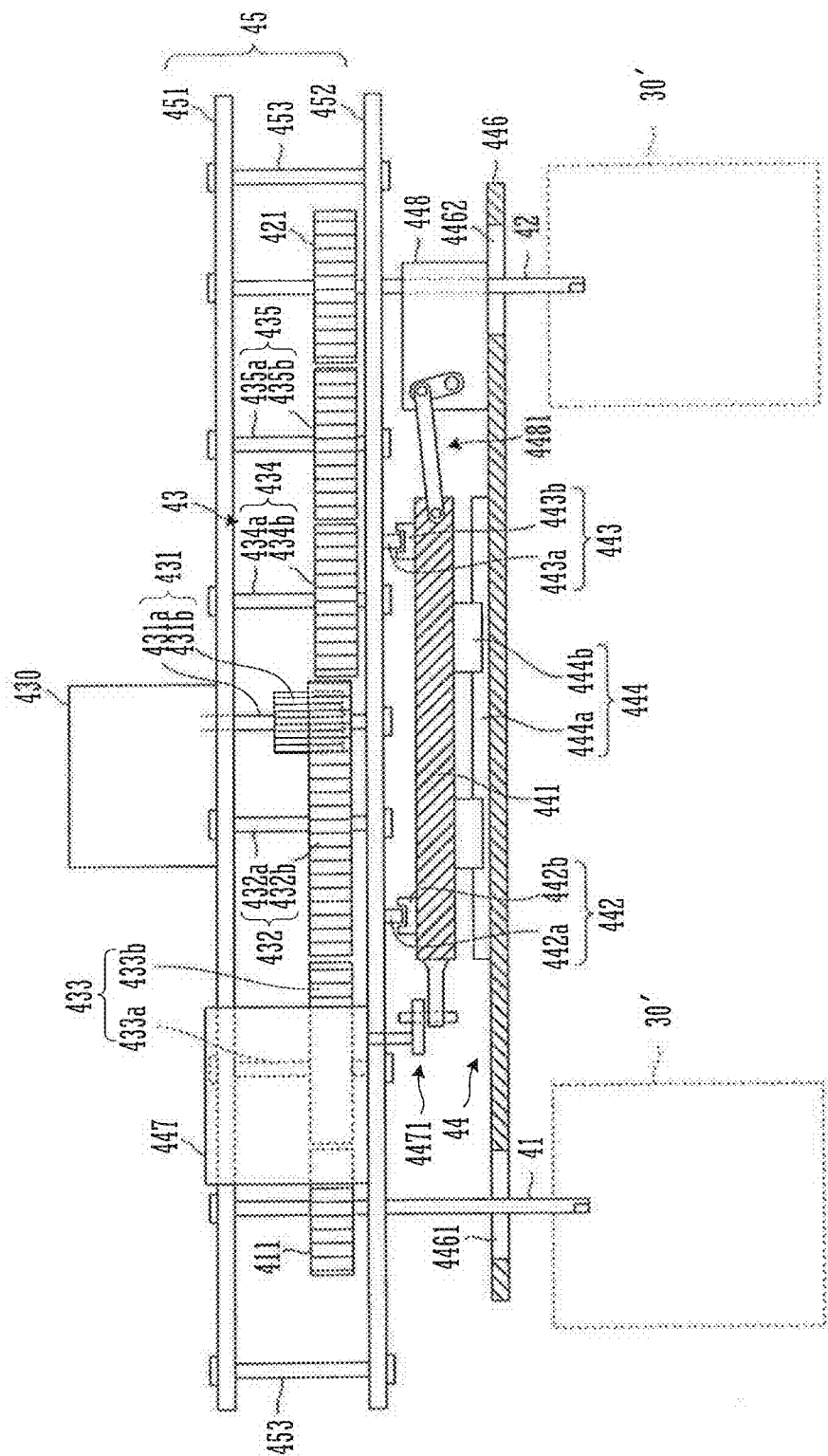

TROCHOID DRIVE SYSTEM

TECHNICAL FIELD

The present invention relates to a trochoid drive system that drives an action part physically relating to the outside in a trajectory along a trochoid curve.

BACKGROUND OF THE INVENTION

Patent Literature 1 proposes a technique of using a trochoid propulsion system to move a legless-chair type vehicle omni-directionally on the floor, the vehicle including eight casters exposed downward and a pair of antislip rear wheels. This system includes the eight casters uniformly arranged around a pivot of a turning cylinder and allows a tie rod engaged with each of the eight casters to steer the rotating directions of the eight casters. More specifically, the tie rod corresponding to each caster is configured to be integrally rotatable with a central base, and in the state where the central base and the pivot coincide with each other in their positions, the cylinder simply turns and the vehicle is in a stopped state. On the other hand, when a steering operation is performed to decenter the position of the central base from the pivot on the horizontal plane, the vehicle travels in a translational mode in the decentering direction while letting the casters turn.

Non Patent Literatures 1, 2 and Patent Literatures 2, 3 disclose a propulsion system having a propulsion principle similar to that of a helicopter, a cycloidal or a propeller and having an axisymmetric omni-directional property, and especially disclose a system to continuously change the translational velocity. Non Patent Literature 3 describes a glide propulsion node that approximates and reproduces a propulsion manner of a living snake mechanistically.

CITATION LIST

Patent Literature

Patent Literature 1: Japanese Patent Application Laid-Open No. 2000-33876
Patent Literature 2: Japanese Patent Application Laid-Open. No. 2004-224147
Patent Literature 3: U.S. Pat. No. 5,993,157

Non Patent Literature

Non Patent Literature 1: Roy. P. Gibbens, "Construction and flying a radio controlled lighter than aircraft powered by cycloidal propellers" 4th International Airship Convention and Exhibition, 2002, PaperA-1
Non Patent Literature 2; Virginia Downward & William M. Clark, "Vertical Paddle Propeller Wheel" 1930
Non Patent Literature 3: Endo, Hirose and Togawa "Proposal of glide propulsion", The 16th Nippon Robot Gakkai Gakujutsu Kouenkai Yokousyu (Vol. 1), pp. 209 to 210, 1998

SUMMARY OF INVENTION

It is required for the omni-directional movement in a plane to implement a trajectory along a trochoid curve as a geometrical solution of linear movement through a continuous action of a rotating system. Actually, however, the trochoid curve is reproduced as a quasi-solution as in Patent Literature 1, and therefore in the case of traveling by caster-driving, there is a problem of large friction loss due to slip, which means an inefficient component against the floor during the action in the rotating direction and the action in the translational direction of the casters. Therefore practical applications are limited to propellers or the like under the fluid environment less influenced by friction, due to slip as shown in Non Patent Literatures 1, 2 and Patent Literatures 2, 3.

In the glide propulsion method shown in Non Patent Literature 3, the steering angle has to be always controlled in accordance with the moving velocity in the direction perpendicular to the traveling direction, and in order to implement such control by electronic control, the increased number of actuators, a complicated control system, the control accuracy and the like will be demanded, and additionally the demands have to be satisfied at a higher level.

In view of these circumstances, it is an object of the present invention, to provide a trochoid drive system capable of realizing a geometrical complete solution of a trochoid curve with a system made up of simple mechanical elements.

A trochoid drive system according to the present invention includes an action part that turns around a driving shaft; and a steering part that co-rotates with the action part and is relatively movable in two-dimensional directions on a turning plane. The action part includes a plurality of action members that are uniformly disposed at positions from the driving shaft by a predetermined radius and along a circumferential direction, each action member being provided rotatably at a corresponding steering shaft parallel to the driving shaft, and the steering part includes a link system that rotates each action member around the corresponding steering shaft. The link system includes: a guide body having a predetermined length in a length direction and attached to the steering shaft so that the length direction is in a radial direction of the steering shaft; and a moving body provided for each guide body, the moving member being movable along the length direction of the guide body. In a state where a center of rotation of the steering part coincides with the driving shaft, a plurality of coupling portions provided at a plurality of outer edge parts of the steering part so as to correspond to the steering shafts are each attached rotatably to the corresponding moving body at a position separated from the steering shaft by a predetermined distance on one of forward and backward sides of the rotation direction.

According to the present invention, the action part turns around a driving shaft, thus relates to the outside physically. Herein, the action part may be a wheel traveling omni-directionally on the ground (floor) as the outside or may be a tin (a wing) and a propeller that moves omni-directionally in the air or on and in the water (fluid) as the outside. This system is applicable to another purpose as well such as a windmill or a water wheel so as to take out a rotating force from the flow of fluid as the outside via fins, and can take out a stable rotating force from the fluid changing over a wider velocity range than the conventional systems. The steering part co-rotates with the turning of the action part. The steering part can relatively move in two-dimensional directions on the turning plane, and can operate the action members of the action part so as to move along a trochoid curve using the link system. For instance, the action members in the form of wheels traveling on the floor are as follows.

For convenience of description, assuming that the floor is horizontal, wheels rolling on the floor are provided steerably at corresponding steering shafts as vertical shafts having the same radius from the driving shaft and provided uniformly along the circumferential direction. Without a steering operation, each wheel simply turns around the driving shaft on the floor along the turning direction. The link system of the steering part rotates each action member around the corresponding steering shaft.

Without a steering operation by the link system, i.e., when the rotating center of the steering part coincides with the driving shaft, each coupling portion of the steering part coupled to the moving body is at the position separated from the steering shaft by a predetermined distance in one of forward and backward sides of the rotation direction, and the predetermined distance is changed in accordance with a steering operation for translational movement on the floor. Herein, when the guide body is attached to the steering shaft so that the longitudinal direction thereof agrees with the tangential direction of the wheel as one example of the action member, since the coupling portion of the steering part is coupled to the moving body, then the coupling portion will be always in the tangential direction of the wheel viewed from the steering shaft. Therefore such a state of the steering shaft and the coupling position of the coupling portion for steering separated by a predetermined distance without the steering operation enables a steering operation of the wheel so as to satisfy a geometric complete solution of a trochoid curve. Further, the configuration therefor can be implemented with simple mechanical elements as a link system simply including a guide body having a predetermined length and a moving body that is movable along the length direction of the guide body.

The following describes a geometrical complete solution of a trochoid curve and actions of the link system.

Assume herein an omni-directional mobile system including a plurality of wheels along the circumference around a vertical driving shaft. This system has a propulsion principle similar to that of a helicopter, a cycloidal or a propeller and is a propulsion system having an axisymmetric omni-directional property. The system has a feature of functioning as a system to continuously change the translational velocity with reference to the shaft rotation as well.

FIG. 1 illustrates steering angles required for the wheels in the above system when the system moves in a translational manner in a specific direction at a constant angular velocity $\omega$. Each wheel is located at the position of a radius rd from the center axis O (corresponding to the above driving shaft, and driving shafts $22a$, $22b$ described later). In FIG. 1, the velocity vectors include a tangential velocity vd around the driving shaft of each wheel, a translational velocity vm of the rotating center and a progression velocity vw of each passive wheel. Then, in order to satisfy a mutual relation among these velocity vectors to implement the trochoid motion, i.e., vw=vd+vm, the direction of the steering angle of each wheel has to be directed always in the same direction as that of Vw. This means that such a system can be an omni-directional mobile system when the steering angle of each wheel is always directed to the tangential direction on the trochoid curve.

Assuming $\theta=\omega t$, vd=rd·$\omega$, vm=rm·$\omega$, vw=(dx/dt, dy/dt) and pw=(x, y) in Mathematical Expression 1 indicating a trochoid curve and FIG. 1, this relation can be found by analysis as in Mathematical Expression 3, based on Mathematical Expression 2 obtained by temporal differentiation of the trochoid curve of Mathematical Expression 1. In these expressions, rm denotes an eccentric amount.

$$x = r_m \theta + r_d \cos \theta$$
$$y = r_m + r_d \sin \theta$$
[Math. 1]

$$\frac{dx}{dt} = r_m \omega - r_d \omega \sin \omega t$$
$$\frac{dy}{dt} = r_d \omega \cos \omega t$$
[Math. 2]

$$\frac{dx}{dt} = v_m - v_d \sin \omega t$$
$$\frac{dy}{dt} = v_d \cos \omega t$$
[Math. 3]

In this way, geometrically speaking, as long as each wheel strictly maintains this steering angle condition, such a rotating system can be a system of implementing a geometrical complete trochoid curve, and it can be said to satisfy the requirements for the aforementioned omni-directional propulsion system. In the above, it can be understood that the same goes for the angular velocity $\omega$ having a negative polarity, similarly to the case of a positive polarity. Therefore, a coupling member may be provided on either of front and rear sides of the rotating direction of the steering shaft.

Next, FIGS. 2A~2C are conceptual diagrams, each of which illustrates an exemplary propulsion system using a trochoid curve, where FIG. 2A is a plan view. FIG. 2B is a side view and FIG. 2C is a front view. FIGS. 3A and 3B explain a similar relation between a velocity vector and a link connection viewed from the surrounding of a wheel steering angle system as a rotation system, where FIG. 3A shows a velocity relation and FIG. 3B illustrates a link connection.

In the propulsion system shown in FIGS. 2A~2C, the steering angle of each wheel WH is decided by eccentric movement of a steering link plate NL with reference to a main arm MA to turn each wheel WH. The eccentric movement herein assumes a mode using a parallel-crosses shaped slider IS, for example. The steering link plate NL is coupled to the main arm MA via a linear slider LS arranged in the parallel-crosses shape of the parallel-crosses shaped slider IS, and co-rotates, i.e., while rotating at the same phase, moves the rotating center horizontally. The leading end position of the steering link plate NL at the eccentric amount ds=0 illustrated in FIGS. 2A~2C is set at a forward constant distance dw=d0 in the tangential direction of the turning circumference of the main arm MA from the rotating center of the steering angle of the wheel WH. Herein, this leading end position and the turning center are connected by a linear slider LS, then device is constructed so that the axial direction thereof is in the direction of the steering angle of the wheel WH. As this time, the velocity vector of FIG. 1 and the link connection of FIGS. 2A~2C have a geometrically similar corresponding relation viewed from the rotation system as in FIGS. 3A and 3B. That is, since the eccentric amount dm (corresponding to rm in FIG. 1) of FIG. 3B causes a circular motion around the center axis at the center of the steering link plate NL, and therefore the aforementioned leading end portion also generates a circular motion with the radius dm in a similar manner. This means that in FIGS. 3A and 3B, vd and d0 vm and dm and vw and dw have a geometrically corresponding similar relation, and so dw of the wheel WH and vw agree with each other, i.e., in their steering angle direction, and further the relation of vm:vd=dm:d0 holds.

Therefore, the translational velocity vm in this system can be continuously and omni-directionally set at any velocity by the eccentric amount dm and the eccentric direction. This link configuration appears to behave like "Vertical Paddle Propeller Wheel" described in Non Patent Literature 2 during operation, but is greatly different therefrom in that (i) the eccentric amount is variable, and (ii) any trochoid curve can be generated because of the system enabling a two-dimensional movement at any amount in a rotating plane around the rotating center while constraining the rotating phase with reference to the steering link NL to implement an eccentric amount variable configuration. Further the present system does not use a complex structured, omniwheel as a system for omni-directional wheel movement in a plane, but uses a normal wheel as a trailing wheel. Therefore a wheel with a larger diameter can be more easily used, and accordingly resistance to bump (irregularity of the floor) can be increased. Moreover, since a drive transmission system to the shaft of the wheel WH does not exist, a suspension can be incorporated and a suspension with a large stroke can be incorporated easily depending on the purpose. Herein, even when the present system is applied to a fin or a purpose of taking out a rotating force, the direction of the fin or the like as the action member may be adjusted in a similar manner, whereby an external physical force (propulsion force or rotating force) can be efficiently taken out.

According to the present invention, a geometric complete solution of a trochoid curve can be implemented with simple mechanical elements.

Further, a smooth propulsion system over a wide range can be provided, having two conditions for a low-velocity range and for a high-velocity range.

BRIEF DESCRIPTION OF DRAWINGS

FIG. 2A is a plan view, FIG. 2B is a side view and a FIG. 2C is a front view.

FIGS. 3A and 3B explain a similar relation between a velocity vector and a link connection viewed from the surrounding of a wheel steering angle system as a rotation system, where FIG. 3A shows a velocity relation and FIG. 3B illustrates a link connection.

FIG. 4A illustrates the low-velocity range state vm<vd and FIG. 4B illustrates the high-velocity range state.

FIG. 7 is a perspective view illustrating a detailed configuration of an outer wheel part as one embodiment.

FIG. 8A is a sectional side view and FIG. 8B is a perspective view illustrating an exemplary slide plate.

FIG. 14A is a sectional side view and FIG. 14B is a perspective view illustrating an exemplary slide part.

FIG. 15 is a partial perspective view when the propulsion system is applied to a tandem type.

DESCRIPTION OF THE PREFERRED EMBODIMENTS

Figure 1:
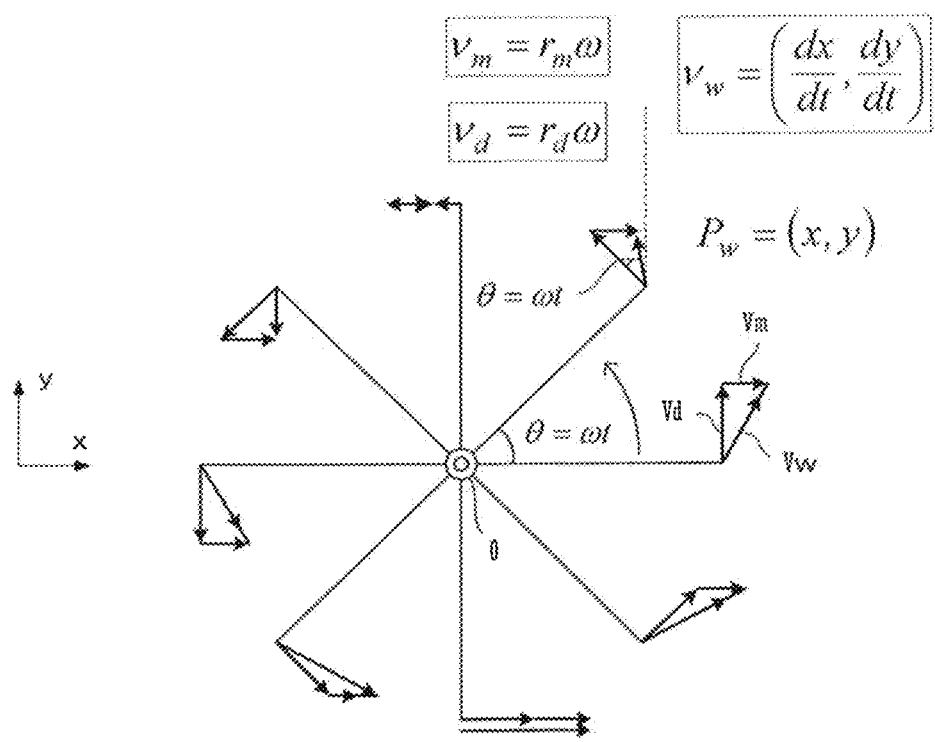
FIG. 1 illustrates a steering angle required for each wheel in the present system when the system moves in a translational manner in a specific direction at a constant singular velocity $\omega$.

Firstly, the basic configuration and its relating forms of a trochoid drive system of the present invention are described below. A trochoid drive system includes an action part that turns around a driving shaft; and a steering part that co-rotates with the action part and is relatively movable in two-dimensional directions on a turning plane. The action part includes a plurality of action members that are uniformly disposed at positions from the driving shaft by a predetermined radius and along a circumferential direction, each action member being provided rotatably at a corresponding steering shaft parallel to the driving shaft, and the steering part includes a link system that rotates each action member around the corresponding steering shaft. The link system includes: a guide body having a predetermined length in a length direction and attached to the steering shaft so that the length direction is in a radial direction of the steering shaft; and a moving body provided for each guide body, the moving member being movable along the length direction of the guide body. In a state where a center of rotation of the steering part coincides with the driving shaft, a plurality of coupling portions provided at a plurality of outer edge parts of the steering part so as to correspond to the steering shafts are each attached rotatably to the corresponding moving body at a position separated from the steering shaft by a predetermined distance on one of forward and backward sides of the rotation direction.

With this configuration, the action part turns around a driving shaft, thus relates to the outside physically. Herein, the action part may be a wheel traveling omni-directionally on the ground (floor) as the outside or may be a fin (a wing) and a propeller that moves omni-directionally in the air or on and in the water (fluid) as the outside. This system is applicable to another purpose as well such as a windmill or a water wheel so as to take out a rotating force from the flow of fluid as the outside via fins, and can take out a stable rotating force from the fluid changing over a wider velocity range than the conventional systems. The steering part co-rotates with the turning of the action part. The steering part can relatively move in two-dimensional directions on the turning plane, and can operate the action, members of the action part so as to move along a trochoid curve using the link system. For instance, the action members in the form of wheels traveling on the floor are as follows.

For convenience of description, assuming that the floor is horizontal, wheels roiling on the floor are provided steerably at corresponding steering shafts as vertical shafts having the same radius from the driving shaft and provided uniformly along the circumferential direction. Without a steering operation, each wheel simply turns around the driving shaft on the floor along the turning direction. The link system of the steering part rotates each action member around the corresponding steering shaft.

Without a steering operation by the link system, i.e., when rotating center of the steering part coincides with the driving shaft, each coupling portion of the steering part coupled to the moving body is at the position separated from the steering shaft by a predetermined distance in one of forward and backward sides of the rotation direction, and the predetermined distance is changed in accordance with a steering operation for translational movement on the floor. Herein, when the guide body is attached to the steering shaft so that the longitudinal direction thereof agrees with the tangential direction of the wheel as one example of the action member, since the coupling portion of the steering part is coupled to the moving body, then the coupling portion will be always in the tangential direction of the wheel viewed from the steering shaft. Therefore such a state of the steering shaft and the coupling position of the coupling portion for steering separated by a predetermined distance without the steering operation enables a steering operation of the wheel so as to satisfy a geometric complete solution of a trochoid curve. Further, the configuration therefor can be implemented with simple mechanical elements as a link system simply including a guide body having a predetermined length and a moving body that is movable along the length direction of the guide body.

In the above trochoid drive system, preferably the steering part includes an operation shaft at the center of rotation, and the action part includes an engagement part that engages with the operation shaft to move the steering part in the two-dimensional directions. With this configuration, when the operation shaft is moved, i.e., is decentered in two-dimensional directions, the decentering from the steering part corresponding to the eccentric amount is performed, via the engagement part. Therefore, when this system is applied to a moving body, the moving body can move omni-directionally by an operation instruction in two-dimensional directions to the steering part.

Preferably, the above trochoid drive system further includes a driving source that turns the action part, and the action members each include a wheel that is rotatably supported by a shaft perpendicular to the steering shaft and rolls on a plane. With this configuration, since a turning operation of the action, part is performed by the driving source, an omni-directional two-dimensional motion is enabled simply by manipulating the operation shaft. Herein, the turning speed may be constant or may be adjustable and variable so as to enable the adjustment of a translational velocity or moving torque.

In the above trochoid drive system, preferably a translational velocity of the action part can be continuously adjusted to be larger or smaller compared with a rolling velocity of the wheels in accordance with a distance of the driving shaft separated from the driving shaft in two-dimensional directions. The following describes the case where the translational velocity is larger or smaller than the rolling velocity of the wheels, i.e., how to deal with a low-velocity range and a high-velocity range of the translational velocity.

Figure 4A:
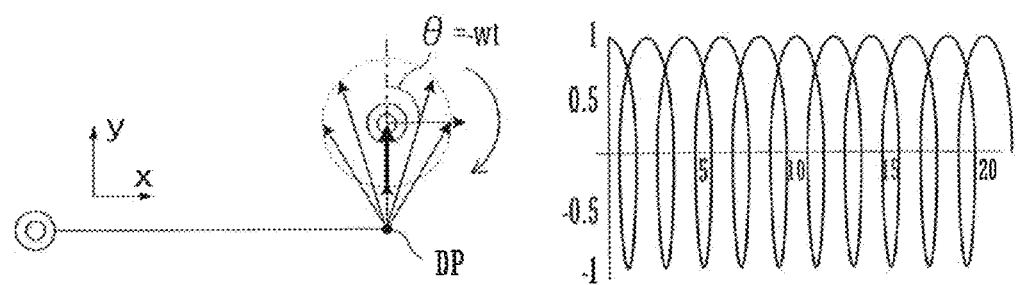
FIGS. 4A and 4B explain a relation between a rotation angle $\theta$ and a steering angle of a wheel viewed from a rotating diameter and a trajectory of a wheel in a X-Y plane in a static system in a low-velocity range state vm<vd and a high-velocity range state vm>vd, where
Figure 4B:
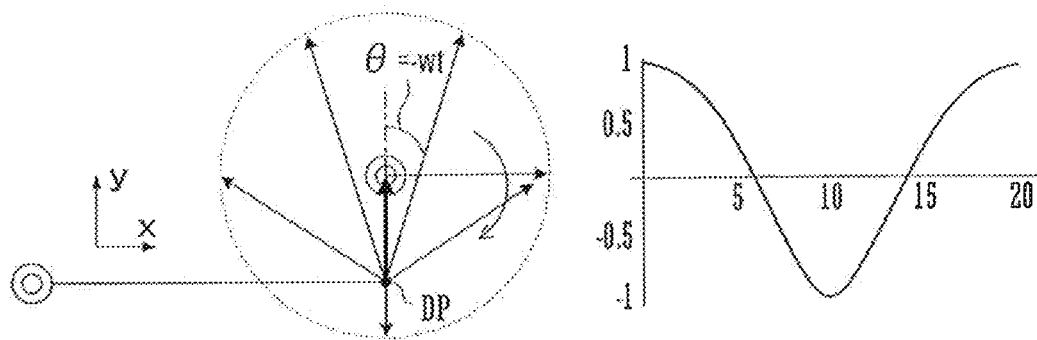

FIGS. 4A and 4B explain a relation between a rotation angle θ and a steering angle of a wheel viewed from a rotating system and a trajectory of a wheel in a X-Y plane in a static system in a low-velocity range state vm<vd and a high-velocity range state vm>vd, where FIG. 4A illustrates the low-velocity range state vm<vd and FIG. 4B illustrates the high-velocity range state vm>vd. In FIGS. 4A and 4B, viewed from the rotating system, while the steering angle reciprocates in FIG. 4A, the steering angle rotates in FIG. 4B. On the other hand, viewed from a static system, while the steering angle rotates with respect to the progressing direction in FIG. 4A, the steering angle reciprocates with respect to the processing direction in FIG. 4B.

For instance, the range of use of a trochoid curve indicated in Patent Literature 1 is limited to a low-velocity range only, which is limited to the use under the condition of vm<vd in FIG. 4A. This is because the consideration for the translational velocity vm is given in the form of shifting from the state of 0, and accordingly the consideration is given for a limit angle of the steering angle as a torque component force from the static state, and further, abrupt change of the steering angle direction that might occur close to vm=vd should be avoided due to a mechanistic reason. Another factor to limit the translational velocity vm to a lower range resides in the complexity of the rotating system. On the other hand, the present system is configured to decide a velocity ratio, and to expect a state during driving so as to be directly associated with a limit angle as a component force in the static system will lead to misunderstanding of the behavior of the system. Then, instead of the starting time from a static state, under the condition of having a sufficient translational initial velocity, the present system can behave as a system implementing a smooth translational motion at a high-velocity range under the condition of vm>vd of FIG. 4B. Non Patent Literature 3 provides an analysis as glide propulsion on the performance characteristics under such a condition, and the operation of the present system follows this.

Further, in the present system, a dead point included in the condition of vm=vd (in FIGS. 4A and 4B, a point DP where vm=vd and θ=π) during the driving of the steering link plate NL can be avoided between differences in phase angle between wheels WH. That is, the dead point can be avoided by, during change of a translational velocity, matching the instant of vm=vd with the timing of passing between differences in phase angle between wheels WH. Thereby, the velocity can be changed continuously from the condition vm<vd to the condition vm>vd (or the reverse), whereby a very wide and continuous velocity range can be dealt with. The present system does not have any special constraint on the velocity definition term ω for such a continuous shifting of the translational velocity, and the dead point can be avoided without influences on the velocity/time trajectory by synchronization control of the angular velocity ω as the velocity definition term and the propulsion ratio α (=vm/vd). Conventionally a propeller or a screw using only one of the two conditions in the trochoid curve is available (Patent Literatures 1, 2 and Non Patent Literatures 1, 2). However, any systems to continuously use such two conditions in one system have not been proposed because the system based on quasi-solutions cannot efficiently realize the two conditions that are greatly different in velocity range from an optimized range. However, the present system, which assumes a link system using a geometric complete solution of a trochoid curve, can use the two conditions in one system.

The present system may have a form including one action part and a rear wheel for limiting rotation that is separately provided, or may have a form including two action parts provided coaxially, each having a different size in the radial direction, or a tandem form including two coupled action parts separated with each other by a predetermined distance.

Preferably the above trochoid drive system further includes: an instruction device that outputs a signal to instruct an eccentric direction and an eccentric amount of the operation shaft; and an eccentric driving part that receives an instruction signal from the instruction device and decenters the operation shaft in a corresponding direction and by a corresponding amount. With this configuration, receiving an instruction signal from the instruction device that is an operation instruction from an operator, the eccentric driving part decenters the operation shaft in the direction and the amount corresponding to the instruction for movement in the instruction direction at the instructed velocity.

In the above trochoid drive system, preferably the action part includes first and second action parts each having a set radius as the predetermined radius from the driving shaft, the first action part is rotated in a direction opposite to a rotation direction by the second action part so that a ratio of velocities between the first action part and the second action part is inversely proportion to a ratio of the predetermined radiuses set for the first and second action parts, and the steering part includes first and second driving shafts, the first driving shaft engaging with the first action part and the second driving shaft engaging with the second action part. With this configuration, the present system, is preferably applied not to the form including one action part and a wheel for limiting rotation, but to a coaxial form or a tandem form. In this case, since wheels of the first action part and the second action part rotate in mutually opposite directions and at a velocity ratio in inversely proportion to a ratio of dimensions of the predetermined radiuses thereof, rotation limit and translational motion can be implemented.

In the above trochoid drive system, preferably the first and second action parts are disposed coaxially and up and down along a height direction, and the wheels of the first and second action parts are disposed at a same height level. With this configuration, first and second driving shafts can be provided coaxially and individually up and down, whereby the steering part can be made compact. The following describes a form including two action parts coaxially provided, i.e., a double inverted type configuration.

Figure 5:
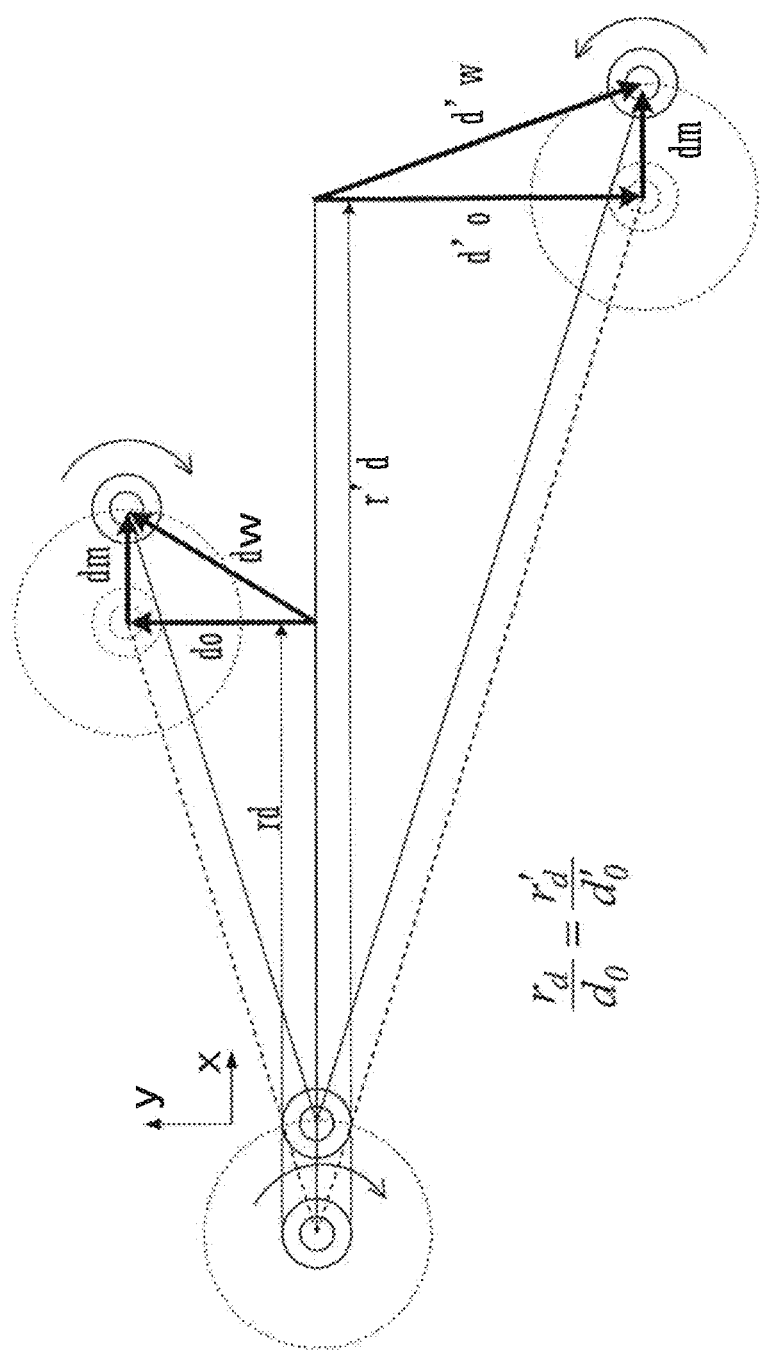
FIG. 5 explains a design condition to share an eccentric amount of a steering link plate and a translational velocity in the double inverted type configuration.

FIG. 5 explains a design condition to share an eccentric amount of a steering link plate and a translational velocity in the double inverted type configuration. In the drawing, Inner Wheels denote an inner system part arranged concentrically, and Outer Wheels denote a system part arranged outside. In the present system, similarly to a helicopter, in order to suppress the rotation of the main body of a moving apparatus due to a reaction force of driving, some countermeasures are required, such as using a trailing wheel corresponding to a tail rotor or a tandem type configuration including a pair of systems having the same configuration but rotating in opposite directions. The following considers the case of the double inverted type configuration where first and second action parts are arranged coaxially. In order to avoid collision, reversed-rotating wheel groups of both of the action parts are forced to move along two circumferences with different radiuses. At this time, since a high degree of accuracy is required for the equivalence of the translational velocities of the wheel groups of both action parts, a solution for mechanistic limitations is required. In the present system, such a condition can be designed as follows based on a relation between the aforementioned eccentric amount and translational velocity.

$$v_m = \frac{v_d}{d_0} = d_m = \omega \frac{r_d}{d_0} d_m \quad \text{[Math. 4]}$$

Figure 2A:
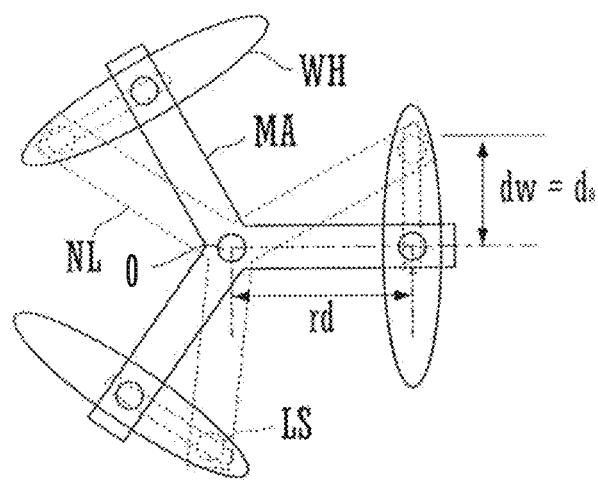
FIGS. 2A~2C are conceptual diagram, each of which illustrates an exemplary propulsion system using a trochoid curve, where
Figure 2B:
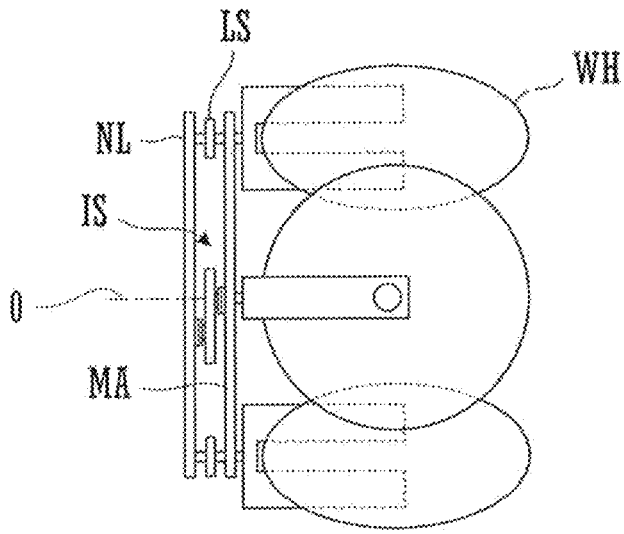
Figure 2C:
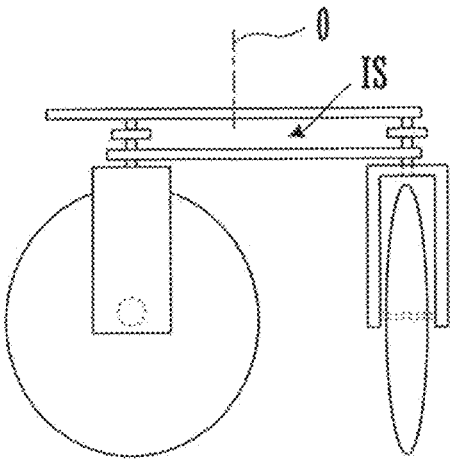

As is understood from Mathematical Expression 4, in the double inverted system sharing the angular velocity ω, equivalent translational velocity vm can be obtained by the equal eccentric amount dm between the two reversed rotating systems having main arms MA with different radiuses as long as the ratio between the radius rd of the main arm MA and the initial offset amount d0 without eccentric is held. That is, a mirror-image body of the system shown in FIGS. 2A~2C may be designed, and the sizes of one of the main arms MA and the steering links NL may be adjusted at unity magnification so that there is a sufficient clearance between the radiuses of the two main arms MA for the steering rotation of each wheel WH. Such large and small mirror-image structures are overlaid coaxially at the center axes, a driving force is applied to both of the center axes so as to rotate in opposite directions while coupling the rotating centers of the steering link plates NL to share the eccentric amount from the center axis, whereby the double inverted system satisfying the above demands can be implemented. With this configuration, a space exclusive for the moving system can be designed in a cylindrical region, whereby omni-directional symmetry of obstacle clearance during the movement on a plane and posture change around the shaft of the moving system due to the axisymmetric configuration can be easily implemented, for example. In this way, the present system has a possibility to be applied very efficiently to an omni-directional wheel-moving type robot.

in the above trochoid drive system, preferably the first and second action parts have a substantially same shape, and are separated from each other by a predetermined dimension on left and right sides. With this configuration, the aforementioned tandem-type form can be used. More specifically, the system letting the ratio of the displacement amount dm and the offset amount d0 agree with the translational velocity vm and the tangential velocity vd, and enabling the displacement amount dm to be commonly taken out at any position of the system brings a lot of design flexibility. For instance, as another solution of the double-inverted type configuration, the ratio between the angular velocity ω' of the inner system and the angular velocity ω of the outer system may be set as a reciprocal ratio of the revolving radiuses d'0 and d0 of the wheel WH, whereby the revolving tangential velocity may be set at the same velocity as v'd=−vd but in an opposite direction, so as to make the offset amount of them d'0=d0, whereby a mirror image steering system having the totally same dimensions and configuration may be designed for use.

Referring next to the drawings, the following describes an embodiment where a trochoid drive system of the present invention is applied to a propulsion system including wheels.

Figure 6:
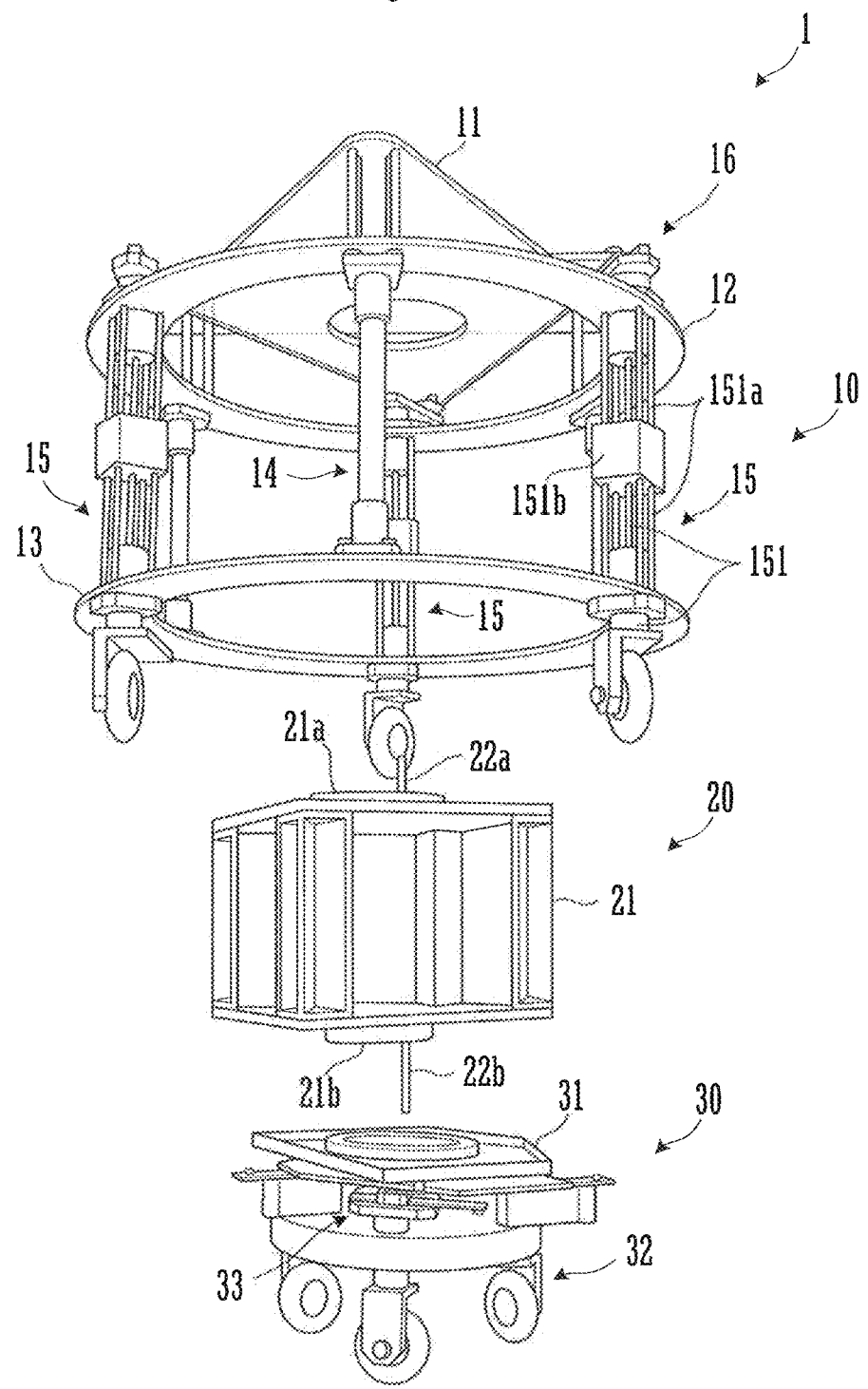
FIG. 6 is an exploded perspective view schematically illustrating an embodiment where a trochoid drive system of the present invention is applied to a propulsion system including wheels.
Figure 9:
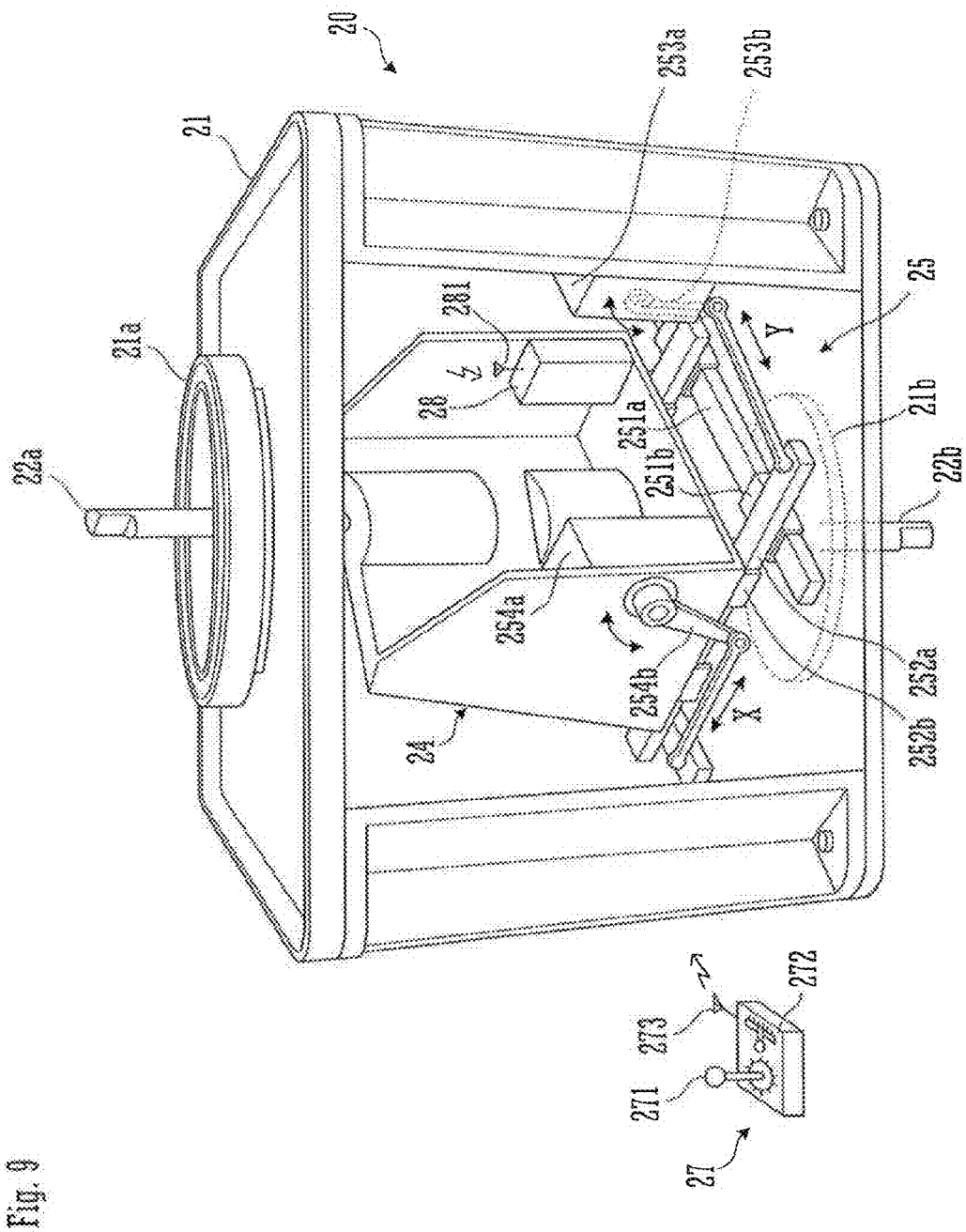
FIG. 9 is a perspective view describing the system of an eccentric driving part.
Figure 10:
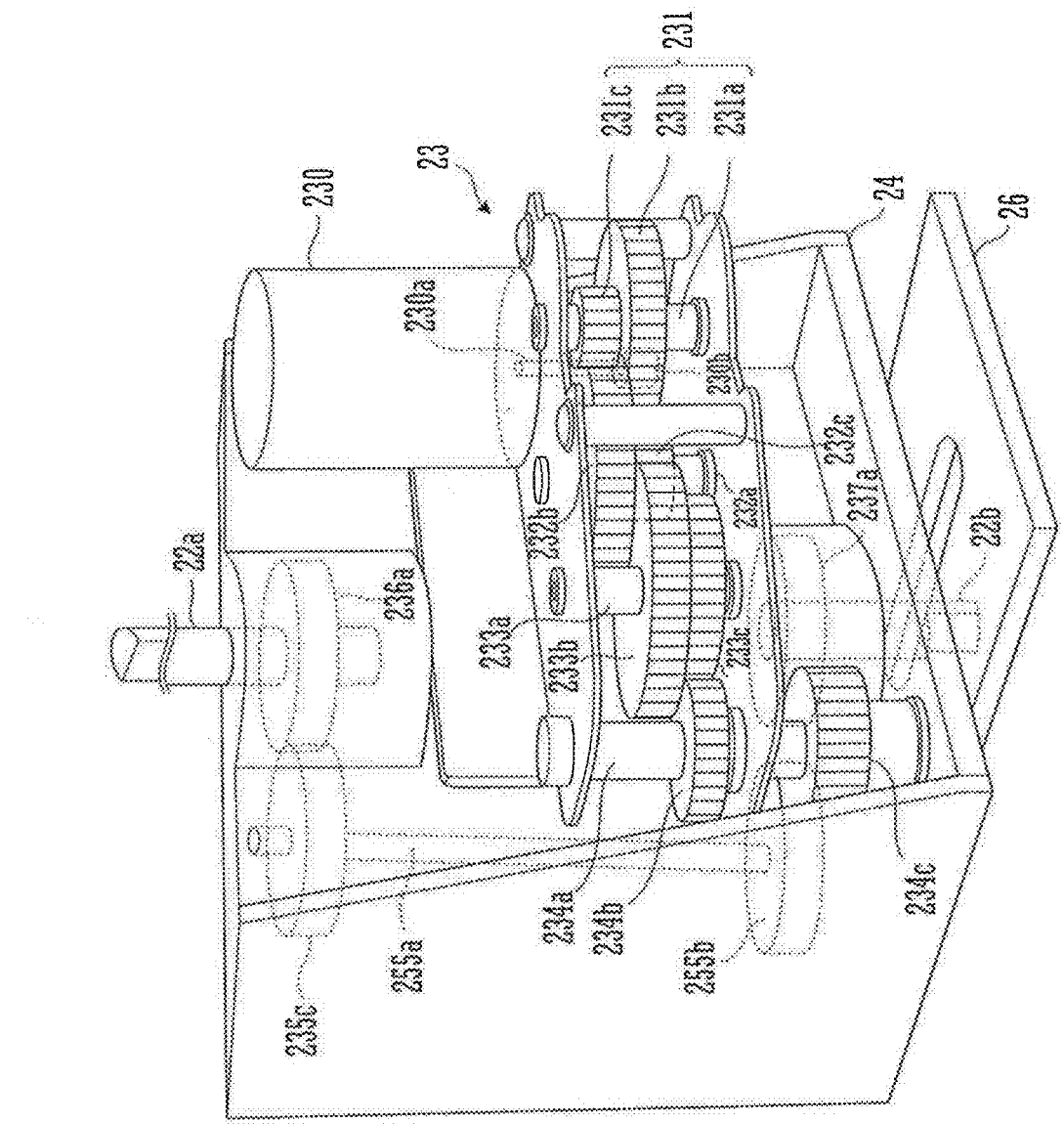
FIG. 10 is a perspective view describing the rotational driving of driving shafts above and below the eccentric driving part.

FIG. 6 is an exploded perspective view schematically illustrating an embodiment where a trochoid drive system of the present invention is applied to a propulsion system including wheels. In FIG. 6, a propulsion system 1 includes an outer wheel part 10, an eccentric driving part 20 and an inner wheel part 30. The outer wheel part 10, the eccentric driving part 20 and the inner wheel part 30 are arranged coaxially in this order. FIG. 6 omits the internal configuration of the eccentric driving part 20, and the details thereof are illustrated in FIG. 9 and FIG. 10.

In FIG. 6, the outer wheel part 10 includes a top plate 11 in a substantially triangle shape corresponding to a main arm, and an upper annular member 12 and a lower annular member 13 arranged in parallel and separated by a predetermined distance and having a substantially same shape. The outer wheel part 10 further includes a supporter 14 that couples and supports the top plate 11, the upper annular member 12 and the lower annular member 13, and a wheel part 15. Such a configuration functions as an action part. The outer wheel part 10 includes a steering link part 16.

The eccentric driving part 20 includes a frame member 21 having a predetermined shape, a rectangular parallelepiped shape in this case, which may be a cylindrical shape, inside which two driving shafts 22a and 22b vertically and coaxially (concentrically) and a system part to decenter these two driving shafts 22a and 22b in a synchronization manner are provided. The eccentric driving part 20 and the steering link part 16 make up a steering part. The frame member 21 has an upper face and a lower face in which annular bearings 21a and 21b respectively having a predetermined diameter are formed.

The inner wheel part 30 basically has a function similar to that of the outer wheel part 10, and includes a top plate 31 corresponding to the main arm and a platform 32. Such a configuration functions as the action part. The inner wheel part 30 includes a steering link part 35. The eccentric driving part 20 and the steering link part 35 make up the steering part.

Figure 8A:
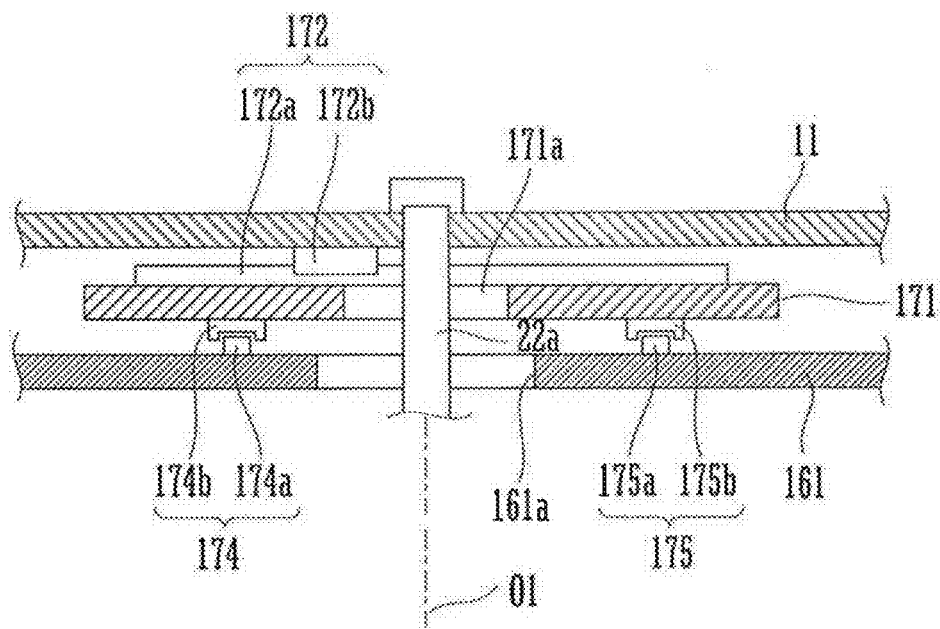
FIGS. 8A and 8B describe the configuration of an exemplary slide part, where
Figure 8B:
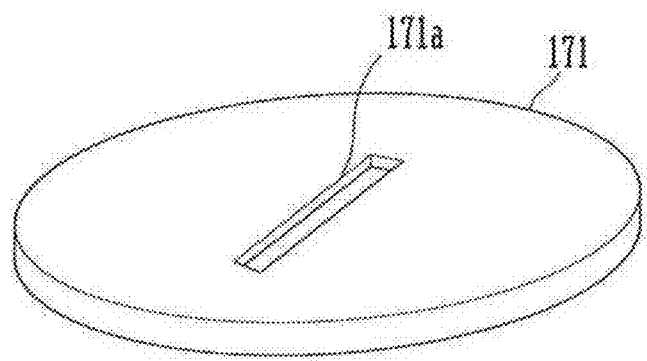

FIG. 7 is a perspective view illustrating a derailed configuration of an outer wheel part as one embodiment. FIGS. 8A and 8B describe the configuration of an exemplary slide part, where FIG. 8A is a sectional side view and FIG. 8B is a perspective view illustrating an exemplary slide plate.

In FIG. 7, the top plate 11, the upper annular member 12 and the lower annular member 13 of the outer wheel part 10 are concentrically arranged with predetermined spaces therebetween vertically, and in this state, the rod-shape supporter 14 is allowed to penetrate therethrough downward from the three vertexes of the top plate 11 in the shape of a regular triangle for integral assembly.

The wheel part 15 is disposed as three positions at the midst between the supporters 14 in the circumferential direction, shifted by the angle of 60° in the present embodiment. The wheel part 15 includes a steering shaft 151 penetrating through the upper annular member 12 and the lower annular member 13 for supporting and being rotatable. The steering shaft 151 includes a horizontal wheel shaft 152 below the lower annular member 13, and to this wheel shaft 152 is rotatably supported a wheel 153 with a required diameter. Between the upper annular member 12 and the lower annular member 13 are provided appropriately a reinforcement rod 151a and a reinforcement frame 151b in the required number to reinforce the strength of the steering shaft 151.

The steering link part 16 is provided between the top plate 11 and the upper annular member 12. The steering link part 16 includes a steering plate 161 in a predetermined shape, a substantially triangle shape in this embodiment, a base 162 fixedly provided at an upper end of the steering shaft 151 to be co-rotatable with the steering shaft 151, and linear sliders 163 horizontally disposed on the upper face of the base 162. The steering plate 161 functions as the steering link arm NL of FIGS. 2A~2C, and includes a circular hole 161a with a predetermined diameter at the center. An operation shaft for steering is located at the center of this circular hole 161a, where any shaft element as an entity does not exist, and relative positional change of the shaft as the center (the center of the circular hole 161a) and the driving shaft 22a moves the operation shaft. Hereinafter this shaft as the center is called an operation shaft O1 (see FIGS. 8A and 8B). Each linear slider 163 includes a guide member 163a with a predetermined length and a moving member 163b that is slidable on the guide member 163a. The guide member 163a is fixedly provided at the upper part of the base 162. In the present embodiment, the guide member 163a is attached to the base 162 so that the length direction of the guide member 163a agrees with the progressing direction of the wheel 153. The moving member 163b has an upper face, on which a rotating shaft 164 is vertically provided. The rotating shafts 164 rotatably support the steering plate 161 at its three vertexes positions.

Between the upper annular member 12 and the lower-annular member 13 is provided a slide part 17. The slide part 17 includes a slide plate 171 in a predetermined shape, e.g., in a circular shape and parallel-crosses shaped linear sliders 172 to 175. The slideplate 171 may have a diameter that is designed as a required diameter, which is preferably larger than the diameter of the circular hole 161a formed in the steering plate 161.

As shown in FIG. 8B, the slide plate 171 includes a slot 171a having a predetermined width and a predetermined length and passing through the center. The outer wheel part 10 and the eccentric driving part 20 are assembled so as to let the driving shaft 22a of the eccentric driving part 20 penetrate through the slot 171a. Then, the leading end of the driving shaft 22a is fixed to the top plate 11, thus conveying a rotating force transmitted from a motor 230. The slot 171a is provided so as to let the driving shaft 22a penetrate therethrough, whereby the slide place 171 is allowed to move in the direction orthogonal to each of the top plate 11 and the steering plate 161, and thereby the slide plate 171 is provided to be co-rotatable while keeping the rotating phase, while permitting a two-dimensional shift between the rotating shafts in the horizontal plane with reference to the top plate 11 and the steering plate 161.

The linear sliders 172 to 175 include guide members 172a to 175a and moving members 172b to 175b in a required number (in the illustration, one) that are slidable on the guide members 172a and 175a. The linear sliders 172 and 173 as a pair are directed to one direction (left and right directions of FIGS. 8A and 8B) in the horizontal direction, and are provided in parallel with the circular hole 161a sandwiched therebetween. The linear sliders 174 and 175 as a pair are directed to another direction (depth direction in sheet of FIGS. 8A and 8B) in the horizontal direction that is perpendicular to the one direction, and are provided in parallel with the circular hole 161a sandwiched therebetween. That is, as shown in FIGS. 8A and 8B, the guide members 172a, 173a of the linear sliders 172, 173 are fixed at the upper face of the slide plate 171, and the moving members 172b, 173b are fixed at the lower face of the top plate 11. Note here that in FIGS. 8A and 8B the linear slider 173 is invisible. Thereby, the slide plate 171 can move (be decentered) in the one direction with reference to the top plate 11. The guide members 174a, 175a of the linear sliders 174, 175 are fixed at the upper face of the steering plate 161, and the moving members 174b, 175b are fixed at the lower face of the slide plate 171. Thereby, the steering plate 161 can move (be decentered) in the other direction perpendicular to the one direction with reference to the slide plate 171. In this way, when the driving shaft 22a moves in the one direction and the other direction on the horizontal plane relatively to the operation shaft O1, i.e., omni-directionally as the synthesized direction, and the steering plate 161 turns as described later, then the steering plate 161 accordingly moves in an operatively associated manner.

That is, as the operation shaft O1 is decentered with reference to the driving shaft 22a, the vortexes of the steering plate 161 move. Since these three vertexes of the steering plate 161 and the rotating shafts 164 are linearly engaged via the linear sliders 163 making up the link system, the direction of the steering shafts 151 accordingly is changed. Therefore, as the operation shaft O1 is decentered with reference to the driving shaft 22a, the steering plate 161 is displaced, and the link system decides the rotating amount (steering amount) of a steering shaft 151. This steering amount will decide a tangential direction of the wheel 153.

The link system is designed beforehand so that, in the state where the operation shaft O1 is not decentered with reference to the driving shaft 22a, the moving member 163b of the linear slider 163 is on the guide member 163a and is located at a predetermined position separated from the steering shaft 151 by a predetermined distance in the turning direction described later, for example, on the forward side in the present embodiment. Further as described later, the outer wheel part 10 turns at a predetermined velocity by receiving a rotational driving force via the driving shaft 22a. Herein, the motion along a geometrical complete solution of a trochoid curve is implemented when vd and d0, vm and dm and vw and dw nave a geometrically corresponding and similar relation in the aforementioned FIGS. 3A and 3B. Therefore, when the eccentric amount dm of the wheel 153 is designated by operation, the link system is used in the present embodiment so that the steering angle directions of dw and vw coincide and the relation of vm:vd=dm:d0 holds, and in the present embodiment so that the predetermined position is located at the distance d0 from the steering shaft 151 in the turning direction. As a result, the wheels 153 achieve the motion along the geometrical complete solution of a trochoid curve as indicated in FIG. 1 and Mathematical Expression 3.

FIG. 9 is a perspective view describing the system of the eccentric driving part 20. FIG. 10 is a perspective view describing the rotational driving of the driving shafts 22a and 22b above and below the eccentric driving part 20. As described above, the eccentric driving part 20 includes the frame member 21 and the upper and lower driving shafts 22a and 22b, and further includes a rotational driving part 23 that gives a rotating force to the driving shafts 22a and 22b, a base 24 that supports the rotational driving part 23, an eccentric driving part 25 that decenters the base 24 on the horizontal plane and a bottom plate 26 including a slot 261 laid at a part of the lower face of the frame member 21.

The eccentric driving part 25 includes a member enabling omni-directional motion on the horizontal plane, the member being provided between the bottom face of the base 24 and the bottom face of the frame member 21. The member may be a parallel-crosses shaped linear slider, for example. As shown in FIG. 9, the eccentric driving part 25 includes a pair of linear sliders 251 provided in the direction parallel to the Y direction and a pair of linear sliders 252 provided in the direction parallel to the X direction. The linear sliders 251 include a guide member 251a fixedly provided at the bottom face of the frame member 21 and a moving member 251b that is slidable on the guide member 251a, and the moving member 251b has an upper face on which a linear slider 252 is fixedly provided. The linear sliders 252 include a guide member 252a fixedly provided at the upper face of the moving member 251b of the linear slider 251 and a moving member 252b that is slidable on the guide member 252a, and the moving member 252b has an upper face fixedly provided at the bottom face of the base 24. As a result, the base 24 is movable in X-Y directions on the horizontal plane with reference to the frame member 21, i.e., is movable omni-directionally.

The eccentric driving part 25 further has a driving source, which includes a driving part 253 to move the moving member 251b of the linear slider 251 in the Y direction and a driving part 254 to move the moving member 252b of the linear slider 252 in the X direction. Both of the driving parts 253 and 254 include a member generating a driving force, for example, motors 253a and 254a, respectively. A driving force from the motor 253a moves the guide member 252a (moving member 251b) backward, and forward via a rotation link structure 253b in Y direction. A driving force from the motor 254a moves the moving member 252b backward and forward via a rotation link structure 254b in Y direction. As is understood from FIG. 9, the rotation link structure includes an output arm that rotates around an output, shaft of the motor and a convey arm provided rotatably at the leading edge of the output arm. The leading edge of the convey arm has a universal structure and is coupled to a guide member. Thereby, the rotating force of the motor, can be securely transmitted to the guide member via the output arm and the convey arm, enabling the base 24 to move in XY directions.

In FIG. 10, the rotational driving part 23 includes a driving source that gives a rotating force to the driving shafts 22a and 22b, e.g., a motor 230, and a transmission system that transmits the rotating force of the motor 230 to the driving shafts 22a and 22b, e.g., a gear group. The gear group includes, firstly, a first relay gear part 231 disposed so as to mesh with an output gear 230b attached to a motor output shaft 230a and a second relay gear part 232 to a fourth relay gear part 234 in this order. The first relay gear part 231 includes a rotation shaft 231a, a first gear 231b and a second gear 231c. The second relay gear part 232 includes a rotation shaft 232a, a first gear 232b and a second gear 232c. The third relay gear part 233 includes a rotation shaft 233a, a first gear 233b and a second gear 233c. The fourth relay gear part 234 includes a rotation shaft 234a, a first gear 234b and a second gear 234c.

Then, the rotating force of the motor 230 is transmitted from the output gear 230b to the first gear 231b, then is transmitted from the second gear 231c to the first gear 232b, then is transmitted from the second gear 232c to the first gear 233b and then is transmitted from the second gear 233c to the first gear 234b.

The downstream side in the transmission direction of the fourth relay gear part 234 is branched off into one transmission path leading to the driving shaft 22a via a fifth relay gear part 235 and the other transmission path leading to the driving shaft 22b from the fourth relay gear part 234. The fifth relay gear part 235 includes a rotation shaft 235a, a first gear 235b and a second gear 235c. The driving shaft 22a includes a final gear 236a. The driving shaft 22b includes a final gear 237a.

Then, the rotating force transmitted to the fourth relay gear part 234 is transmitted from the second gear 234c to the first gear 235b, and then is transmitted from the second gear 235c to the final gear 236a. Meanwhile, the rotating force transmitted to the fourth relay gear part 234 is transmitted from the second gear 234c to the final gear 237a. Thereby, both or the driving shafts 22a and 22b rotate, in this case, the ratio between the gears adjusted beforehand allows the driving shafts 22a and 22b to rotate at a predetermined, velocity ratio. The fifth relay gear part 235 further provided between the fourth relay gear part 234 and the driving shaft 22a allows the rotation directions of the driving shaft 22a and the driving shaft 22b to be reversed. As described later, the driving shaft 22b turns the inner wheel part 30, and the rotation of the driving shafts 22a and 22b in the opposite directions allows the outer wheel part 10 and the inner wheel part 30 to turn mutually in the opposite directions. For example, a velocity ratio therebetween may be set so as to be in inverse proportion to a ratio of distances from the driving shafts 22a and 22b located coaxially to the position of the wheels of the outer wheel part 10 and to the wheels of the inner wheel part 30 (when the outer wheel part 10 and the inner wheel part 30 have the wheels with the same diameter). When these parts have different wheel diameters, the velocity ratio may be set with consideration further given to the ratio of the diameters.

Referring back to FIG. 9, a wireless instruction device 27 includes an eccentric instruction member 271, a turning speed instruction member 272 and an antenna 273 for transmission. The eccentric instruction member 271 includes a joy stick and the like, for example, to produce a signal corresponding to the eccentric direction and the eccentric amount of the motors 253a and 254a in accordance with the tilt directions X, Y and the tilt angle, and the signal is modulated into a radio-wave signal to be transmitted from the antenna 273. The turning speed instruction member 272 generates a rotating speed signal of the motor 230 in accordance with the manipulation (slide) amount, and the signal is transmitted from the antenna 273.

The frame member 21 includes, at an appropriate position, in the present embodiment at an appropriate position in the base 24, a drive control part 28. The drive control part 28 includes an antenna 281 to receive a radio-wave signal from the antenna 273, and produces a drive control signal to drive the motor 230 and the motors 253a and 254a based on the received signal. Herein instead of the form of modulating the turning speed instruction signal, the eccentric direction instruction signal and the eccentric amount instruction signal into radio-wave signals for transmission, a close-range communication method using light and ultrasonic waves may be used or a cable transmission method may be used. In this way, remotely-issued instructions for the turning speed and the eccentric amount, i.e., the steering direction facilitate the operation.

Figure 11:
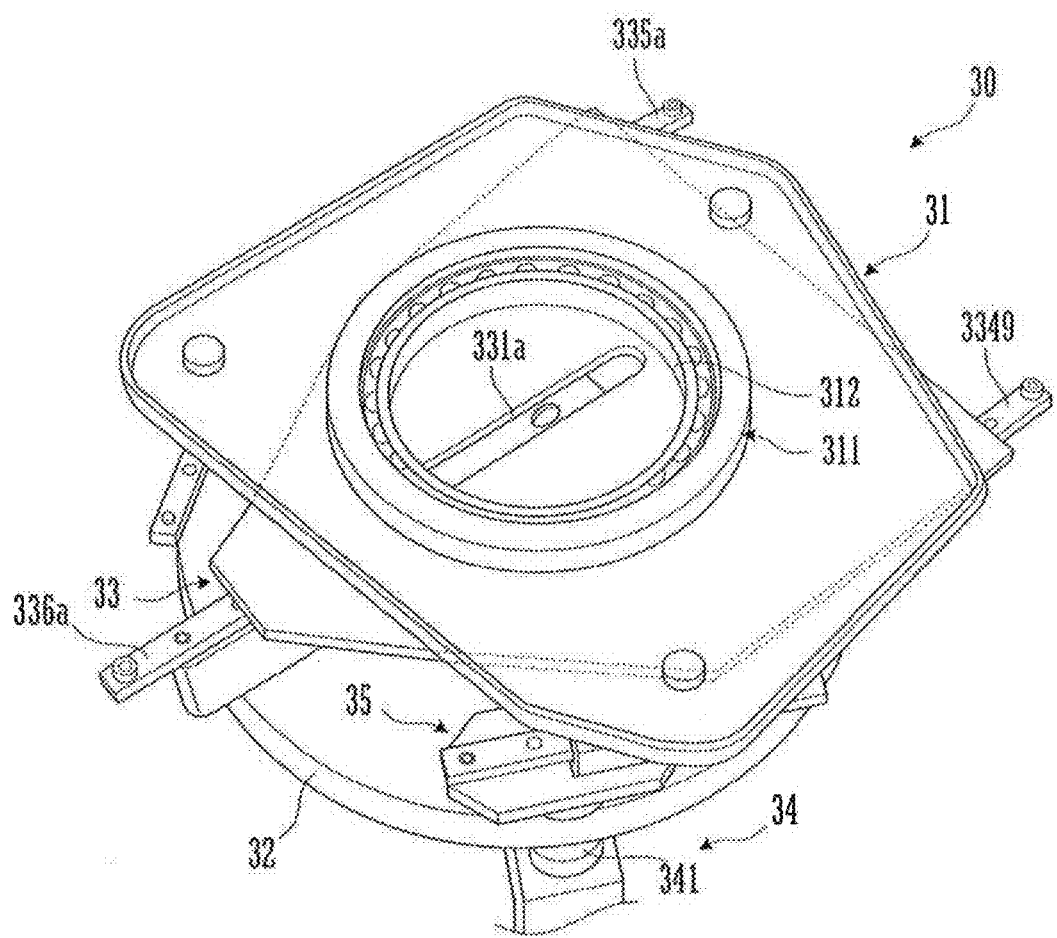
FIG. 11 is a perspective view from above of an inner wheel part.
Figure 12:
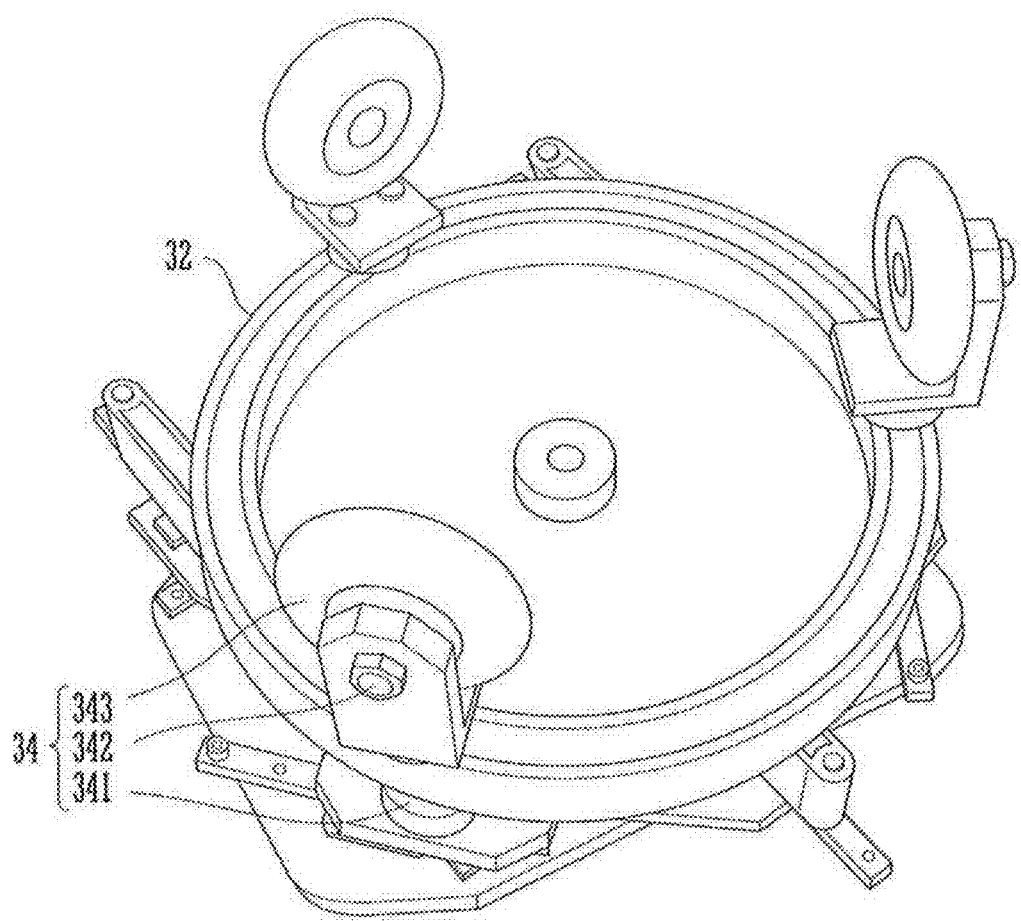
FIG. 12 is a perspective view from below of the inner wheel part.
Figure 13:
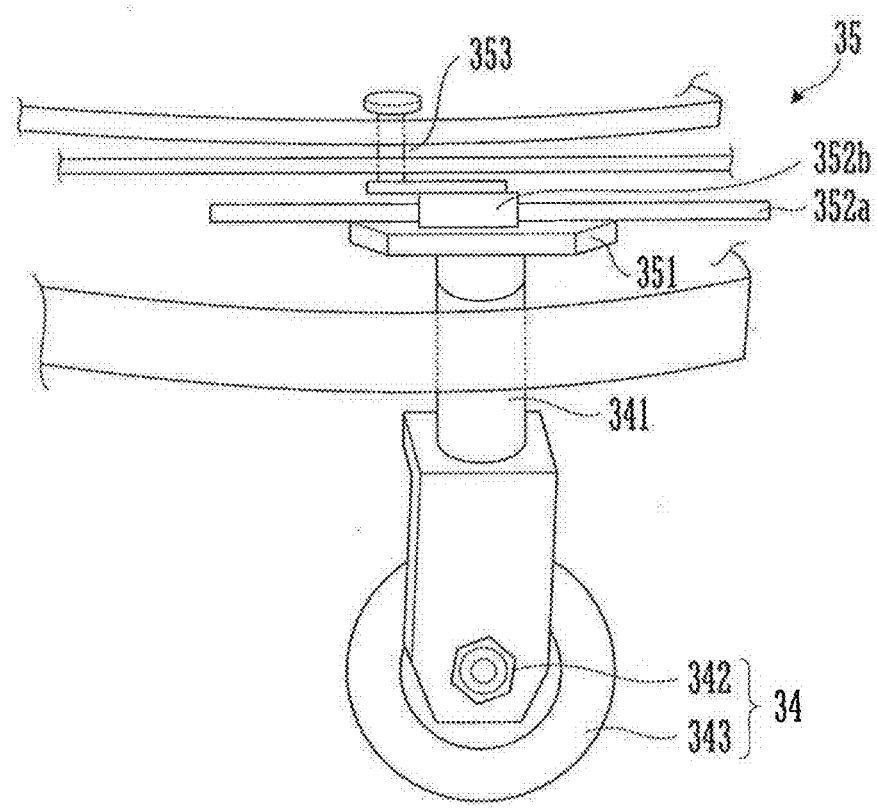
FIG. 13 is a partial perspective view to describe the configuration of a steering link part.
Figure 14A:
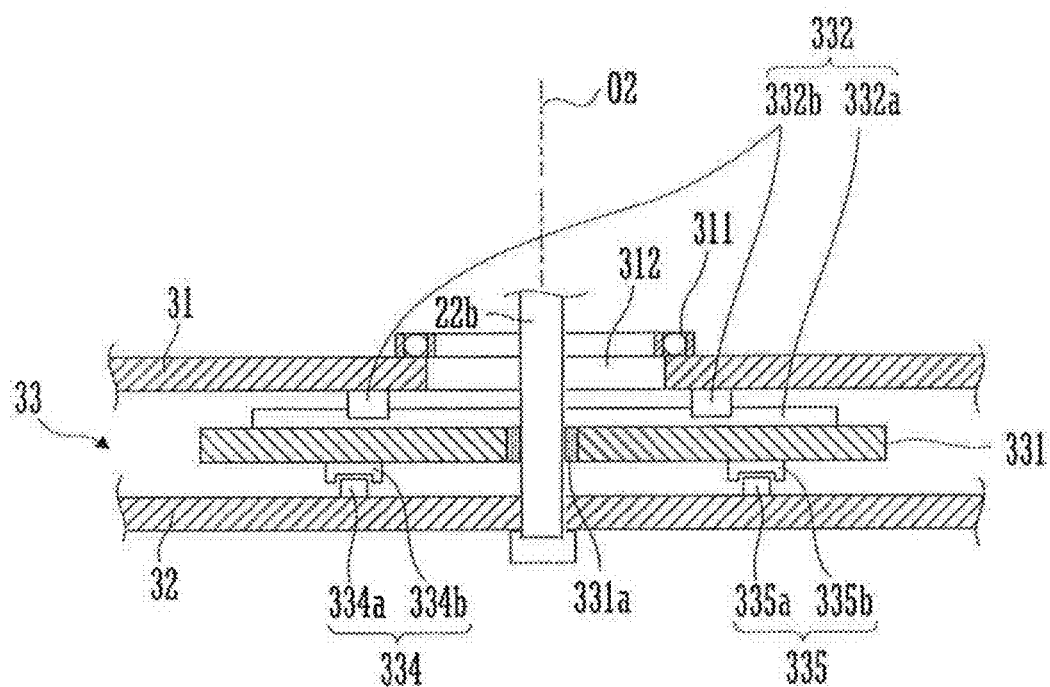
FIGS. 14A and 14B describe the configuration of one exemplary slide part, where
Figure 14B:
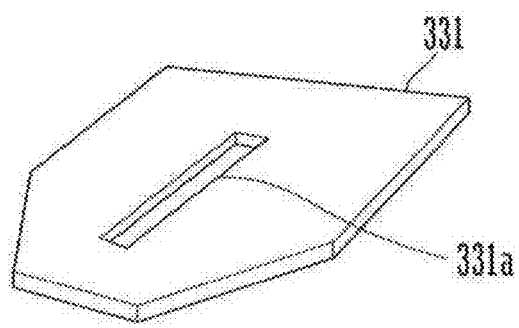

FIG. 11 is a perspective view from above of the inner wheel part 30. FIG. 12 is a perspective view from below of the inner wheel part 30. FIG. 13 is a partial perspective view to describe the configuration of the steering link part 35. FIGS. 14A and 14B describe the configuration of one exemplary slide part, where FIG. 14A is a sectional side view and FIG. 14B is a perspective view illustrating an exemplary slide part 33.

The inner wheel part 30 includes the top plate 31 and the platform 32 disposed vertically said concentrically with a predetermined space therebetween, between which the slide part 33 is provided. At predetermined positions of the outer edge of the platform 32 is provided wheel part 34. Between the top plate 31 and the wheel part 34 is provided the steering link part 35. The top plate 31 has a predetermined shape, e.g., a substantially triangle shape, and functions as the steering link arm NL in FIGS. 2A~2C. At the center of the top plate 31 is provided a bearing 311 with a predetermined diameter in a protruding manner, having a circular hole 312 on the inner diameter side. An operation shaft for steering is located at the center of this bearing 311 (i.e., the circular hole 312), where any shaft element as an entity does not exist, and relative positional change of the shaft as the center and the driving shaft 22b moves the operation shaft. Hereinafter this shaft as the center is called an operation shaft O2 (see FIGS. 14A and 14B). During assembly of the eccentric driving part 20 and the inner wheel part 30, the bearing 21b is fitted into this inner hole 312 of the bearing 311. The platform 32 has a disk shape. At three parts in the circumferential direction of the platform 32 are uniformly provided the wheel parts 34 having the same shape.

As illustrated in FIG. 12 and FIG. 13 mainly, the wheel part 34 vertically penetrates the platform 32, and includes a steering shaft 341 that is rotatably supported by the platform 32. The steering shaft 341 includes a horizontal wheel shaft 342 below thereof, and to this wheel shaft 342 is rotatably supported a wheel 343 with a necessary diameter. In the present embodiment, the wheel 343 and the wheel 153 have a same diameter and dimensions.

As illustrated in FIG. 13, the steering link part 35 is provided between the top plate 31 and the platform 32. The steering link part 35 includes a base 351 fixedly provided at an upper edge of the steering shaft 341 to be integrally rotatable with the steering shaft 341, and a linear slider 352 horizontally disposed on the upper face of the base 351. The linear slider 352 includes a guide member 352a with a predetermined length and a moving member 352b that is slidable on the guide member 352a. The moving member 352b has an upper face, on which a rotating shaft 353 is vertically provided. The rotating shafts 353 are rotatably supported at substantially three vertexes positions of the top plate 31.

The slide part 33 is provided between the top plate 31 and the platform 32. The slide part 33 includes a slide plate 331 having a predetermined shape, e.g., a substantially triangle shape and linear sliders 332 to 336 arranged like a parallel-crosses shape. The slide plate 331 may have a diameter that is designed as a required diameter, which is preferably larger than the circular hole 312 formed in the top plate 31, but is preferably a size that does not cause interference of the rotating trajectory of the outer edge part with the position of the steering link part 35.

As shown in FIGS. 14A and 14B, the slide plate 331 includes a slot 331a passing through the center. The inner wheel part 30 and the eccentric driving part 20 are assembled so as to let the driving shaft 22b of the eccentric driving part 20 penetrate through tine slot 331a. Then, the leading end of the driving shaft 22b is fixed to the platform 32, thus conveying a rotating force transmitted from the motor 230. The slot 331a is provided so as to let the driving shaft 22b penetrate therethrough, whereby the slide plate 331 is allowed to move in a translational manner in the direction orthogonal to each of the top plate 31 and the platform 32, and thereby the slide plate 331 is provided to be co-rotatable while keeping the rotating phase, while permitting a two-dimensional shift between the rotating shafts in the horizontal plane with reference to the top plate 31 and the platform 32.

The linear sliders 332 to 336 include guide members 332a to 336a and moving members 332b to 336b that are slidable on the guide members 332a to 336a (note here that in FIGS. 14A and 14B, the linear slider 333 is invisible and the linear slider 336 is omitted in illustration). The linear sliders 332 and 333 as a pair are directed to one direction (left and right directions of FIGS. 14A and 14B) in the horizontal direction, and are provided in parallel with the slot 331a sandwiched therebetween. The linear sliders 334 to 336 are directed to another direction (depth direction in sheet of FIGS. 14A and 14B) in the horizontal direction that is perpendicular to the one direction, and are distributed at three positions around the slot 331a. That is, as shown in FIGS. 14A and 14B, the guide members 332a, 333a of the linear sliders 332, 333 and the like are fixed at the upper face of the slide plate 331, and the moving members 332b, 333b are fixed at the lower face of the top plate 31. Thereby, the slide plate 331 can move (be decentered) in the one direction with reference to the top plate 31. The guide members 334a to 336a (see FIG. 11) of the linear sliders 334 to 336 are fixed at the upper face of the platform 32, and the moving members 334b to 336b (herein 336b is invisible) are fixed at the lower face of the slide plate 331. Thereby, the platform 32 can move (be decentered) in the other direction perpendicular to the one direction with reference to the slide plate 331. In this way, when the driving shaft 22b moves in the one direction and the other direction on the horizontal plane relatively to the operation shaft O2, i.e., omni-directionally as the synthesized direction, then the platform 32 accordingly moves in an operatively associated manner.

That is, as the operation shaft O2 is decentered with reference to the driving shaft 22b, the vertexes of the platform 32 move. Since these three vertexes of the platform 32 and the rotating shaft 353 are linearly engaged via the linear slider 352 making up the link system, the direction of the steering shaft 341 accordingly is changed. Therefore, as the operation shaft is decentered with reference to the driving shaft 22b, the platform 32 is displaced, and the link system decides the rotating amount (steering amount) of the steering shaft 341. This steering amount will decide a tangential direction of the wheel 343.

The link system is designed beforehand so that, in the state where the operation shaft O2 is not decentered with reference to the driving shaft 22b, the moving member 352b of the linear slider 352 is on the guide member 352a and is located at a predetermined position separated from the steering shaft 341 by a predetermined distance in the turning direction described later. Further as described later, the inner wheel part 30 turns at a predetermined velocity by receiving a rotational driving force via the driving shaft 22b. As a result, the wheels 343 achieve the motion along the geometrical complete solution of a trochoid curve as indicated in FIG. 1 and Mathematical Expression 3.

FIG. 15 is a partial perspective view when the propulsion system is applied to a tandem type. The system illustrated in FIG. 15 is such that the eccentric driving part 20 of FIG. 6 is configured applicable to a tandem type. The tandem type refers to the structure where a wheel part 30' having the same function as the inner wheel part 30 and a part 30" having a mirror-image structure thereof are provided as a pair in parallel with a predetermined distance provided therebetween. Alternatively, the inner wheel part 30 may be used or the outer wheel part 10 may be used. In the case of these structures, however, the rotating shaft rotates as a mirror-image structure, and the wheel parts also have to be configured to have a pair of mirror-image structure including the clockwise system and the counterclockwise system.

In FIG. 15, a propulsion system 1A includes operation shafts 41, 42, a rotational driving part 43 and an eccentric driving part 44 and a supporter 45 supporting them.

The supporter 45 includes flat plates 451 and 452 each having a predetermined shape such as a rectangular shape, which are vertically spaced with a predetermined distance therebetween, including bosses 453 in the required number intervened therebetween, and are in parallel with each other. The operation shafts 41, 42 correspond to the driving shafts 22a and 22b, having a vertical predetermined length, and are rotatably supported at the flat plates 451 and 452, respectively, and are horizontally spaced with a predetermined distance therebetween. Similarly to the driving shafts 22a and 22b, the operation shafts 41, 42 include, at their lower ends, a D-cut face as a co-rotation shape. Herein, the operation shafts 41 and 42 include gears 411 and 421 fixedly provided at predetermined positions between the flat plates 451 and 452.

The rotational driving part 43 includes a motor 430 as a driving source, an output gear part 431 and relay gear parts 432 to 435 that sequentially mesh with each other. The output gear part 431 includes an output shaft 431a and an output gear 431b fixedly provided at the output shaft 431a. The relay gear parts 432 to 435 include output shafts 432a to 435a and relay gears 432b to 435b, respectively. Then, the relay gear 432b meshes with the output gear 431b the relay gear 433b meshes with the relay gear 432b and the gear 411 meshes with the relay gear 433b, and thereby the rotating force of the motor 430 is transmitted to the operation shaft 41.

On the other hand, on the side of the operation shaft 42, the relay gear 434b simultaneously meshes with the relay gear 432b, the relay gear 435b meshes with this relay gear 434b, and the gear 421 meshes with the relay gear 435b. Thereby, the rotating force of the motor 430 is transmitted to the operation shaft 42. Therefore, the operation shafts 42 and 43 rotate in opposite directions. When the while parts 30' and 30" have the same configuration (the wheels have the same turning radius), the rotating speed of the operation shafts 41, 42 can be the same by adjusting the ratio of the gears. When they are different, the ratio may be set so as to be in inverse proportion to the ratio of turning radiuses.

The eccentric driving part 44 is provided below the flat plate 452. The eccentric driving part 44 includes a slide plate 441 directed horizontally and in a predetermined shape, e.g., the shape of a substantially rectangle, for example, parallel-crosses shaped linear sliders 442 to 445, and an eccentric plate 446 provided in parallel to the slide plate 441 and below the slide plate 441.

As shown in FIG. 15, on both of the left and right sides of the eccentric plate 446 are provided circular holes 4461 and 4462 having a required diameter bored therein, into which bearings provided at the upper parts of the wheel parts 30' in a protruding manner are fitted. Therefore, the space between the circular holes 4461 and 4462 of the eccentric plate 446 defines the spaced distance between a pair of wheel parts in the tandem type.

The eccentric driving part 44 further Includes a motor 447, for example, as a driving source fixedly provided at the flat plate 452, and a transmission system part 4471 that transmits a rotating force of the motor 447 to the slide plate 441. The eccentric driving part 44 still further includes a motor 448, for example, as a driving source fixedly provided at the eccentric plate 446, and a transmission system part 446 that transmits a rotating force of the motor 448 to the slide plate 441.

The linear sliders 442 to 445 include guide members 442a to 445a and moving members 442b to 445b that are slidable on the guide members 442a and 445a (note here that in FIG. 15, the linear slider 445 is invisible). The linear sliders 442 and 443 as a pair are directed to the depth direction in sheet of FIG. 15 and are provided in parallel with each other, and the guide members 442a, 443a are fixed at the lower face of the flat plate 452, and the moving members 442b, 443b are fixed at the upper face of the slide plate 441. The linear sliders 444 and 445 as a pair are directed to the lateral direction of FIG. 15 and provided in parallel with each other, the guide members 444a and 445a are fixed at the upper face of the eccentric plate 446, and the moving members 444b and 445b are fixed at the lower face of the slide plate 441. Thereby, the eccentric plate 446 can be decentered with reference to the flat plate 452 omni-directionally on the horizontal plane. That is, the operation shafts 41, 42 can be decentered with reference to the eccentric plate 446 omni-directionally on the horizontal plane by the same amount in a relatively and operatively associated manner.

Similarly to the case of the inner wheel part 30, the link system is designed beforehand so that, in the state where the operation shafts 41, 42 are not decentered relatively, the moving member 332b of the linear slider 352 is on the guide member 352a and is located at a predetermined position separated from the steering shaft 341 by a predetermined distance in the turning direction, whereby the wheel 343 even in this tandem structure achieves the movement along the geometrical complete solution of a trochoid curve as indicated in FIG. 1 and Mathematical Expression 3.

The present invention can be in the following forms.

(1) In the present embodiment, the wheels are uniformly provided at three positions in the circumferential direction. However, as long as the wheels are provided uniformly, wheels may be provided at a predetermined number of positions that is three or more.

(2) In the present embodiment, the outer wheel part and the inner wheel part are disposed concentrically or in the tandem form. Instead, one of the outer wheel part and the inner wheel part may be used as an action part and a pair of antislip wheels (trailing wheels) may be provided, from which a similar effect can be obtained.

(3) Instead of linear sliders, a uniaxial sliding body may be used to control the movement of a coaxial member in the axial direction.

(4) The linear sliders are used for decentering of the steering shaft in X and Y directions. Instead, a driving system such as belt drive or rack/pinion may be used.

(5) The present embodiment is configured so that, in the state where the driving shafts 22a and 22b of the eccentric driving part 20 are not decentered, the vertical direction of the driving shafts 22a and 22b in the outer wheel part 10 and the inner wheel part 30 is set as a center axis. Herein, this center axis may be a virtual one, or in another form, the center axis may be provided for the sake of convenience. For instance, as for the outer wheel part 10, the vertical line connecting the center points of the upper annular member 12 and the lower annular member 13 becomes the center axis.

(6) In the present embodiment, decentering of the driving shafts 22a and 22b is controlled in accordance with an instruction signal from the wireless instruction device 27. Instead of this, the driving shafts 22a and 22b may be directly manipulated by an operator.

(7) Explaining the outer wheel part 10 side, for example, preferably, the configuration to optimally control a camber angle of the wheels 153 additionally is provided. Especially in the trochoid propulsion system in the state where steering is continuously turned, the optimized camber angle of the wheels 153 can reduce a further steering loss. To this end, there is a need to cause a wheel shaft 152 of the wheel 153 as a trailing wheel (indicated for the outer wheel part 10) subjected to steering angle control to continuously point the intersection of the ground and the center axis of the radius of curvature of the trajectory. More specifically, the operation is required to find the current center of radius of the curvature and an angle of the wheel shaft 152 of the wheel 153 to be inclined at that position and then to let the wheel shaft 152 in the direction continuously. Meanwhile, since the system of the steering link part 16 keeps the wheel shaft 152 to be in the direction in the horizontal plane, control may be performed using the system so that the wheel shaft 152 intersects the center of radius of the curvature on the ground along the rotating direction around the steering angle vector dw. In this system, due to the configuration, the aforementioned link system (steering link) for the steering angle to generate a wheel trajectory may include an additional link system, whereby a function to generate an optimum camber angle at the same time can be given thereto.

Figure 16A:
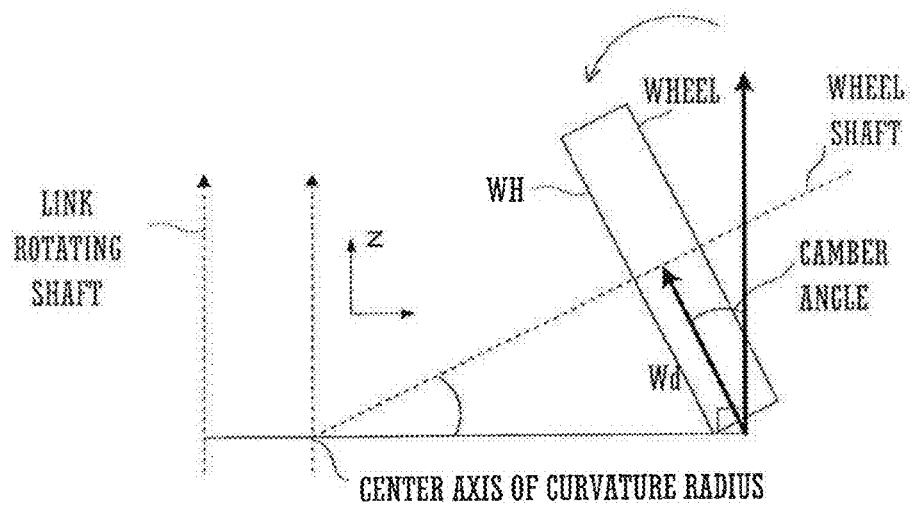
FIGS. 16A and 16B illustrate the control of a camber angle, where FIG. 16A explains a camber angle and FIG. 16B describes the angle adjustment using the link system of a camber angle relating to the rotation of a wheel.
Figure 16B:
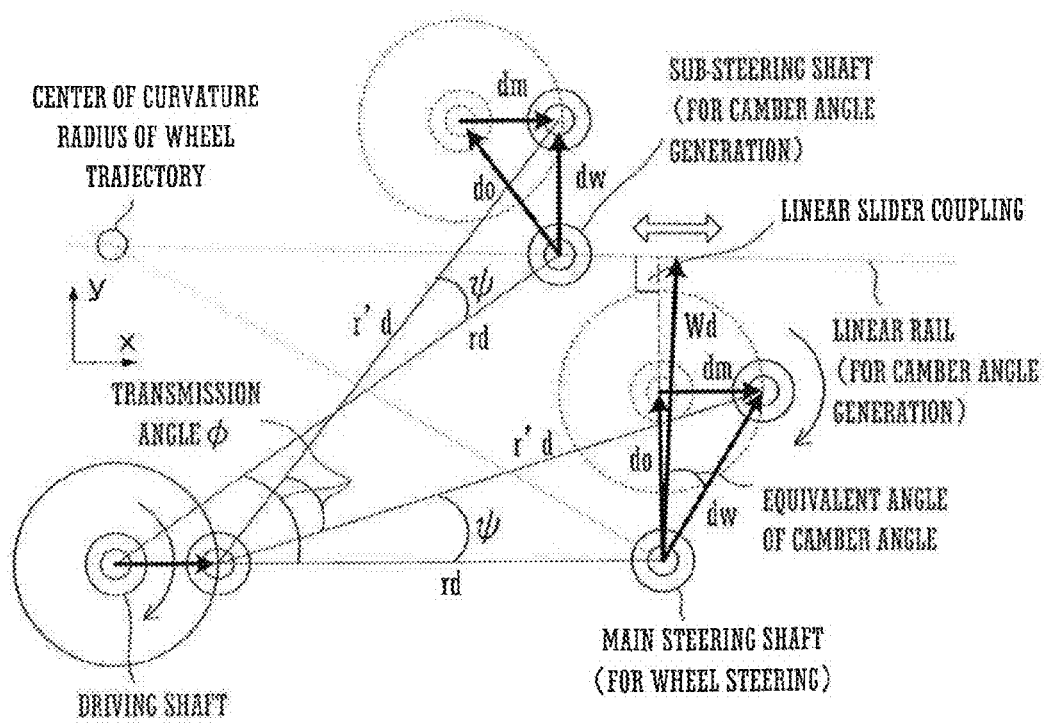

FIGS. 16A and 16B illustrate the control of a camber angle, where FIG. 16A explains a camber angle and FIG. 16B describes the angle adjustment using the link system of a camber angle relating to the rotation of a wheel. As illustrated in FIG. 16B, the present system includes a sub-steering shaft to adjust a camber angle. The position of the sub-steering shaft is not fixed, and in FIG. 16B, the sub-steering shaft rotates around a driving shaft in the plane of a main arm (corresponding to the top plate 11 of FIG. 7) indicated with rd with the diameter of rd. A relative angle (transmission angle) φ with a main steering shaft (corresponding to the steering shaft 151 of FIG. 7) is transmitted from the main arm (corresponding to the steering plate 161 of FIG. 7) side to the steering link side (a relative angle Ψ of the main arm with the steering link is kept on the sub-steering start side as well similarly to the main-steering shaft side), the steering direction dw of the sub-steering shaft can be decided, whereby the direction of a linear rail (guide member side) of the perpendicular linear slider can be decided. Engagement with the linear slider so as to be perpendicular to a link arm having the same length of the radius Wd of the wheel WH (corresponding to the wheel 153 of FIG. 7) extending from the main steering shaft can determine the camber angle of the wheel 153 as an intersection angle between the direction of the radius Wd and the direction dw of the main steering shaft.

Figure 17:
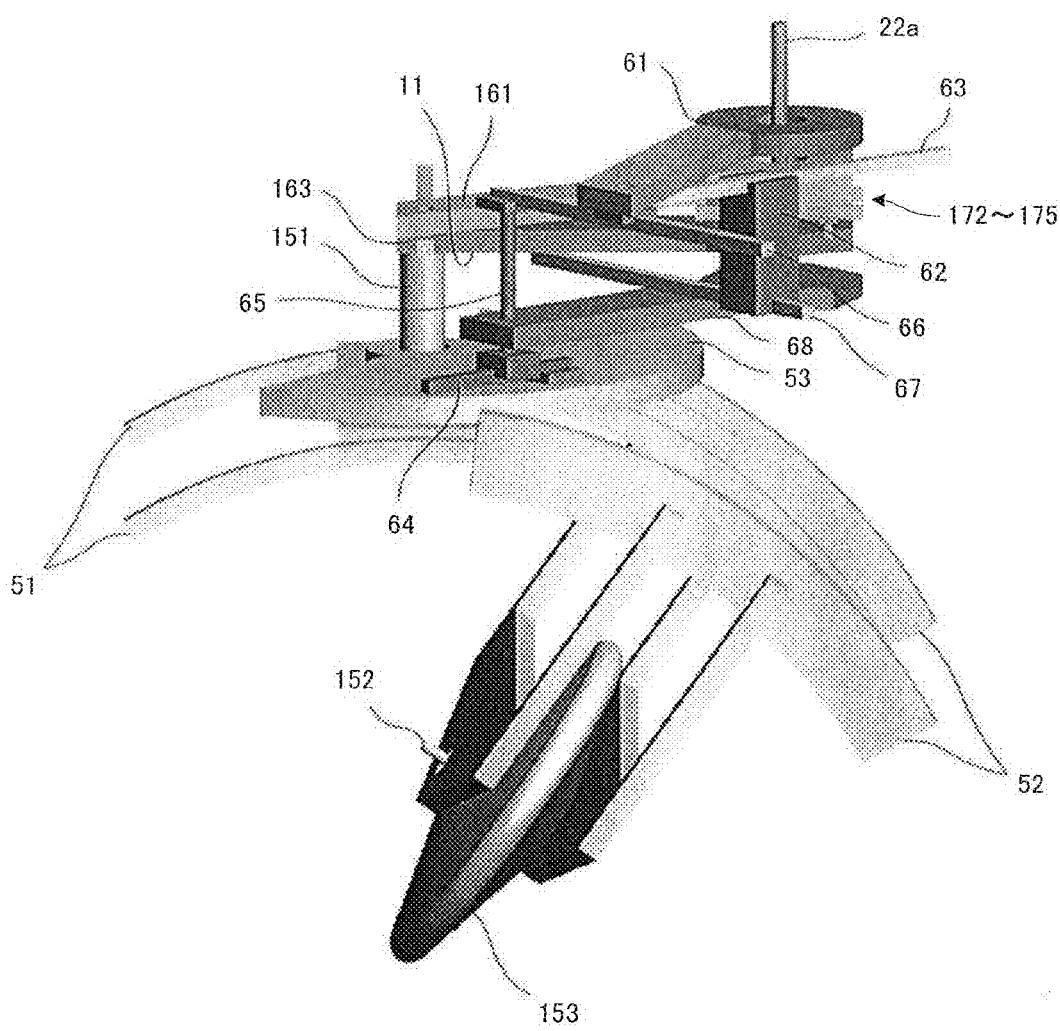
FIG. 17 schematically illustrates a system for camber angle adjustment control.

FIG. 17 schematically illustrates a system for camber angle adjustment control. In FIG. 17, the elements with the same reference numbers as those in the configurations described referring to FIG. 6 to FIGS. 8A and 8B have the same functions and so their descriptions are omitted. The configuration for camber angle adjustment includes a pair of arc-shaped slide members 51 to fan-shaped gears 53 as a system to change the camber angle provided between the steering shaft 151 and the wheel shaft 152 as well as a rotation arm 61 to a linear slider 67 arranged concentrically with the center (steering shaft 22a) of the turning part corresponding to the steering plate 161 as a system to change and control the camber angle in an operatively associated with the turning operation.

The configuration for camber angle adjustment includes the above-stated arc-shaped slide member 51 provided integrally rotatable with the steering shaft 151, a rack member 52 having the same radius of curvature and shape as those of the slide member 51, moving while sliding with reference to slide member 51, including a rack gear formed on a side face of one side of the pair and being provided integral with the wheel shaft 152, and a pinion member 53 having a fan shape that is concentric with the steering shaft 151 and is relatively rotatable and including a gear to mesh with the rack gear of the rack member 52 formed on the periphery. The rack member 52 and the wheel shaft 152 are designed so that the moving direction of the rack member 52 and the wheel shaft 152 are in the same plane. In such a configuration, as the steering shaft 151 rotates, the pinion member 53 moves the rack member 52 in the arc direction with reference to the slide member 51, and this movement leads to a change of the camber angle of the wheel 153 with reference to the wheel grounding point as a center of the arc. Herein, the slide member 51 and the rack member 52 may have a linear shape instead of the arc shape. Instead of the mesh configuration of the pinion member 53 and the rack member 52 including the rack gear formed thereon, meshing structure using the same diameter bevel gear may be used.

Next, a system to change and control the camber angle in operatively associated with the turning includes the aforementioned rotation arm 61, a standing member 62 provided at a predetermined position (a position to detour around the center axis by a corresponding amount), supporting the parallel-crosses shaped linear sliders 63, 67 (described later) between the main link and the steering link of the sub-steering system as stated above and functioning as an angle constraint system to hold, with the linear sliders 63, 67, an angle Ψ (relative angle Ψ of FIG. 16B) between the rotation arm 61 and a below-described main arm member 68, a linear slider 63 including a rail-form guide member provided between the leading-end side of the rotation arm 61 and the standing member 62 and directed horizontally and a moving member sliding therealong, and making the angle Ψ with the rotation arm 61, a vertical shaft 65 coupled at the upper face of the pinion member 53 and at a position separated, from the center axis by a required radius via a linear slider 64 directed in the chord direction, a linear slider 66 provided between the linear slider 63 and the vertical shaft 65 and a linear slider 67 provided on the lower part side of the standing member 62 and in the direction perpendicular to the linear slider 63 on the horizontal plane. The system to change and control the camber angle in operatively associated with the turning further includes the main arm member 68 on the sub-steering side functioning as a link arm having the rotating axis common to that of the main arm on the main steering side and being freely rotatable around the axis and rotatably supporting the vertical shaft 65, and the rail-form guide member of the linear slider 67 is coupled to this main arm member 6B. Herein, the linear sliders basically have the same configuration.

In the above configuration, when the decentering operation is not performed for the driving shaft 22a, the vertical shaft 65 does not rotate and the camber angle is held at a constant angle. On the other hand, when the decentering operation is performed for the driving shaft 22a, a distance between the rotation arm 61 and the steering shaft 151 varies as the outer wheel part 10 turns, and therefore the vertical shaft 65 rotates via the linear sliders 63 and 66. Such rotation causes the rotation of the pinion member 53 via the linear slider 64. As the pinion member 53 rotates, the rack member 52 slides in operatively association manner, and the camber angle changes in operatively associated with this sliding. In this way, the configuration to change the camber angle in operatively associated with the turning operation so as to always obtain a preferable camber angle based on the relation between the tangential direction of the wheel 153 and the translational direction can further reduce a steering loss.

REFERENCE SIGNS LIST 1, 1A Propulsion system
10 Outer wheel part (a part of action part)
11 Top plate
12 Upper annular member
13 Lower annular member
14 Supporter
15 Wheel part (action member)
151 Steering shaft
153 Wheel
16 Steering link part (operating part, link system)
161 Steering plate (a part or link system;
163 Linear slider
163a Guide member
163b Moving member
164 Rotating shaft (a part of link system)
17 Slide part (engagement part)
20 Eccentric driving part (a part of steering part)
21 Frame member
22a, 22b Driving shaft
23 Rotational driving part
230 Motor (driving source)
24 Base
25 Eccentric driving part
26 Bottom plate
27 Wireless instruction device (instruction device)
28 Drive control part
30 Inner wheel part (a part of action part)
31 Top plate
32 Platform
33 Slide part (engagement part)
34 Wheel part (action member)
343 Wheel
35 Steering link part (a part of steering part)
41, 42 Operation shaft
43 Rotational driving part
44 Eccentric driving part
45 Supporter
IS Parallel-crosses slider
LS Linear slider
MA Main arm
NL Steering link plate
WH Wheel
O1, O2 Operation shaft

The invention claimed is:

1. A trochoid drive system, comprising an action part that turns around a driving shaft; and a steering part that co-rotates with the action part and is relatively movable in two-dimensional directions on a turning plane,
wherein
the action part includes a plurality of action members that are uniformly disposed at positions from the driving shaft by a predetermined radius and along a circumferential direction, each action member being provided rotatably at a corresponding steering shaft parallel to the driving shaft, and
the steering part includes a link system that rotates each action member around the corresponding steering shaft,
wherein
the link system includes:
a guide body having a predetermined length in a length direction and attached to the steering shaft so that the length direction is in a radial direction of the steering shaft; and
a moving body provided for each guide body, the moving body being movable along the length direction of the guide body, and
in a state where a center of rotation of the steering part coincides with the driving shaft, a plurality of coupling portions provided at a plurality of outer edge parts of the steering part so as to correspond to the steering shafts are each attached rotatably to the corresponding moving body at a position separated from the steering shaft by a predetermined distance on one of forward and backward sides of the rotation direction.

2. The trochoid drive system according to claim 1, wherein the steering part comprises an operation shaft at the center of rotation, and
the action part includes an engagement part that engages with the operation shaft to move the steering part in the two-dimensional directions.

3. The trochoid drive system according to claim 2, further comprising a driving source that turns the action part, wherein the action members each include a wheel that is rotatably supported by a shaft perpendicular to the steering shaft and rolls on a plane.

4. The trochoid drive system according to claim 3, wherein a translational velocity of action part can be continuously adjusted to be larger or smaller compared with a rolling velocity of the wheels in accordance with a distance of the operation shaft separated from the driving shaft in two-dimensional directions.

5. The trochoid drive system according to claim 3, further comprising:
an instruction device that outputs, a signal to instruct an eccentric direction and an eccentric amount of the operation shaft; and
an eccentric driving part that receives an instruction signal from the instruction device and decenters the operation shaft in a corresponding direction and by a corresponding amount.

6. The trochoid drive system according to claim 3, wherein the action part includes first and second action parts each having a different radius as the predetermined radius from the driving shaft,
the first action part is rotated in a direction opposite to a rotation direction of the second action part so that a ratio of velocities between the first action part and the second action part is inversely proportion to a ratio of the predetermined radiuses set for the first and second action parts, and the steering part includes first and second driving shafts,
the first driving shaft engaging with the first action part and the second driving shaft engaging with the second action part.

7. The trochoid drive system according to claim 6, wherein the first and second action parts are disposed coaxially and up and down along a height direction, and the wheels of the first and second action parts are disposed at a same height level.

8. The trochoid drive system according to claim 6, wherein the first and second action parts have a substantially same shape, and are separated from each other by a predetermined dimension on left and right sides.

* * * * *